(12) United States Patent
Kobayashi et al.

(10) Patent No.: US 7,516,368 B2
(45) Date of Patent: Apr. 7, 2009

(54) APPARATUS, METHOD, AND COMPUTER PRODUCT FOR PATTERN DETECTION

(75) Inventors: Kenichi Kobayashi, Kawasaki (JP); Nobuhiro Yugami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 561 days.

(21) Appl. No.: 10/974,363

(22) Filed: Oct. 27, 2004

(65) Prior Publication Data

US 2005/0283680 A1   Dec. 22, 2005

(30) Foreign Application Priority Data

Jun. 21, 2004   (JP) .............................. 2004-182520

(51) Int. Cl.
*G06F 11/00* (2006.01)
(52) U.S. Cl. .......................... 714/39; 714/45
(58) Field of Classification Search ................... 714/39, 714/37, 45, 48
See application file for complete search history.

(56) References Cited

U.S. PATENT DOCUMENTS

| | | | | |
|---|---|---|---|---|
| 5,278,901 | A * | 1/1994 | Shieh et al. | 726/22 |
| 7,016,133 | B2 * | 3/2006 | Ehrlich | 360/51 |
| 7,203,289 | B2 * | 4/2007 | Jedlicka | 379/112.06 |
| 2003/0236766 | A1 * | 12/2003 | Fortuna et al. | 707/1 |
| 2004/0177053 | A1 * | 9/2004 | Donoho et al. | 706/47 |
| 2005/0172162 | A1 * | 8/2005 | Takahashi et al. | 714/4 |
| 2005/0240582 | A1 * | 10/2005 | Hatonen et al. | 707/6 |

FOREIGN PATENT DOCUMENTS

| | | |
|---|---|---|
| JP | 8-314981 | 11/1996 |
| JP | 9-064971 | 3/1997 |
| JP | 10-134086 | 5/1998 |
| JP | 11-025169 | 1/1999 |
| JP | 11-085521 | 3/1999 |
| JP | 2000-003282 | 1/2000 |
| JP | 2000-181759 | 6/2000 |
| JP | 2000-242632 | 9/2000 |
| JP | 2000-353095 | 12/2000 |
| JP | 2001-005793 | 1/2001 |
| JP | 2001-331350 | 11/2001 |
| JP | 2002-024251 | 1/2002 |
| JP | 2002-092284 | 3/2002 |

(Continued)

OTHER PUBLICATIONS

R. Agrawal et al.; "Fast Algorithms for Mining Association Rules"; Proc. of the 20th Int'l Conf. on Very Large Databases; pp. 1-32; Santiago, Chile; Sep. 1994.

(Continued)

*Primary Examiner*—Dieu-Minh Le
(74) *Attorney, Agent, or Firm*—Greer, Burns & Crain, Ltd

(57) ABSTRACT

An occurrence pattern of an event is detected from an event log based upon information concerning plural kinds of relationships defined among events, such as a simultaneity rule, an order rule, a proximity rule, a cause determination rule, and a result prediction rule and an occurrence pattern of the detected event is output. Accordingly, when an occurrence pattern of an event is detected from event data storing information concerning an occurred event, detailed information about an occurrence pattern of an event can be extracted from an event log.

13 Claims, 18 Drawing Sheets

FOREIGN PATENT DOCUMENTS

| | | |
|---|---|---|
| JP | 2003-216869 | 7/2003 |
| JP | 2004-102681 | 4/2004 |
| JP | 2004-110327 | 4/2004 |

OTHER PUBLICATIONS

S. Ma et al.; "Mining Mutually Dependent Patterns"; 2001 IEEE Int'l Conf. on Data Mining; pp. 1-20; San Jose, CA; Nov. 20-Dec. 2, 2001.

Kenichi Kobayashi et al. "Action Browser: A Knowledge Discovery Tool for Time-Series Data Based on A Markov Model." Jan. 30, 2003.

Nobuhiro Yugami et al. "Discovery of Exception Rules from Numeric Attributes." Oct. 29, 1999.

Takeshi Fukuda et al. "A Visualization Method for Association Rules." May 26, 1995.

* cited by examiner

FIG.4
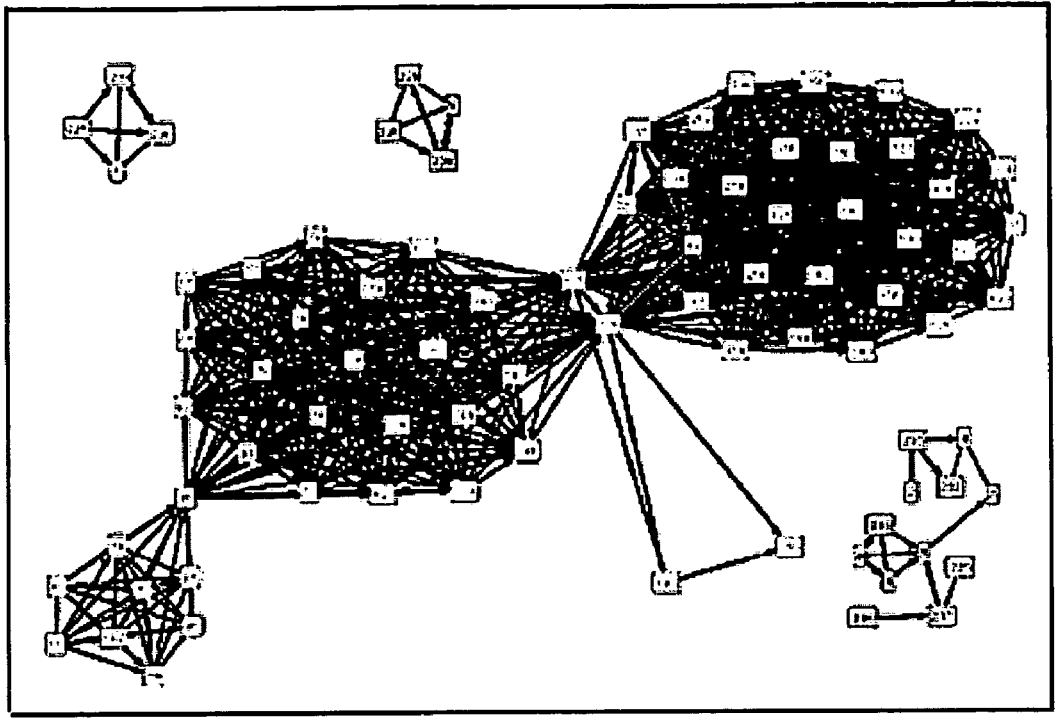
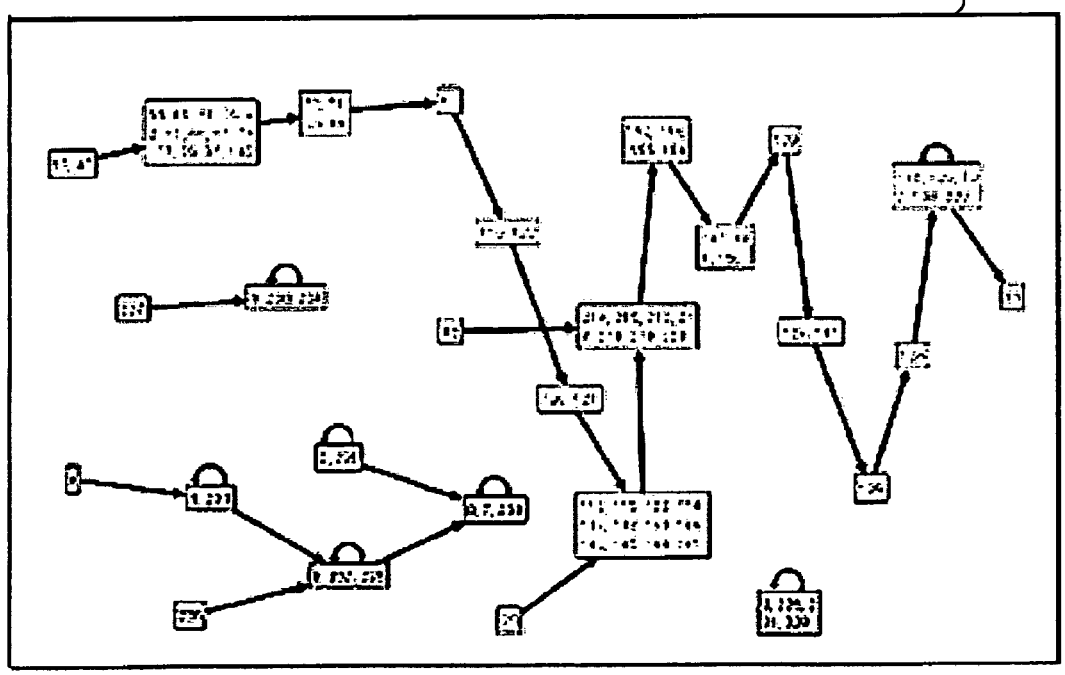

FIG.10

| | CONCURRENCY RULE | ORDER RULE | PROXIMITY RULE | RESULT PREDICTION RULE | CAUSE DETERMINATION RULE |
|---|---|---|---|---|---|
| CONCURRENCY RULE | ○ | ○ | ○ | ○ | ○ |
| ORDER RULE | ○ | ○ | ○ | ○ | ○ |
| PROXIMITY RULE | ○ | ○ | ○ | ○ | ○ |
| RESULT PREDICTION RULE | ○ | ○ | ○ | ○ | × |
| CAUSE DETERMINATION RULE | ○ | ○ | ○ | × | ○ |

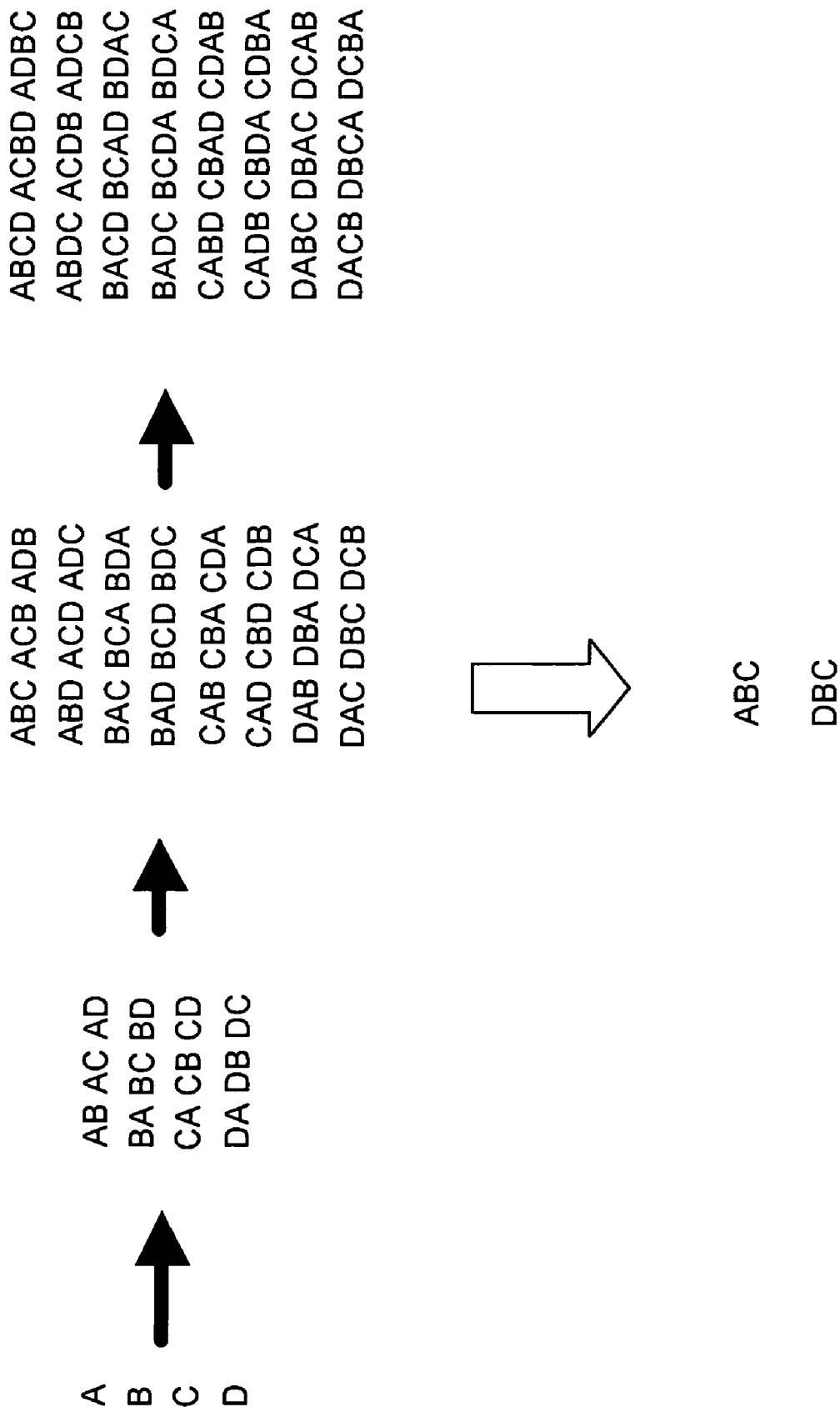

APPARATUS, METHOD, AND COMPUTER PRODUCT FOR PATTERN DETECTION

BACKGROUND OF THE INVENTION

1) Field of the Invention

The present invention relates to an apparatus, a method, and a computer product for detecting pattern of occurrence of an event from event data storing information on events occurred.

2) Description of the Related Art

Event analyzing systems have been known. These event analyzing systems analyzes occurrences of various events, such as illegal transaction to an accounting system of a bank, illegal access to a web site on Internet. These event analyzing systems also detect signs of failure in a network system to take measures to avoid an accident or a trouble in advance.

FIG. 16 is a schematic of an event analyzing system 2 that analyzes an occurrence pattern of an event, and FIG. 17 is a diagram of one example of an event log recording an occurred event. The event analyzing system 2 acquires an event log from a customer system 1 to detect an occurrence pattern of an event confirmed noticeably when a failure occurs and accumulate the same as know-how.

The term "event log", shown in FIG. 17, means a log where information or data on events such as errors occurred in the customer system 1 has been written. Specifically, the event log is recorded with an occurrence time of an event, a kind of the event, and other additional information pieces.

Referring to FIG. 1, the event analyzing system 2 analyzes an event log in the customer system 1 to monitor whether an occurrence pattern of a detected event is included in the event log according to a pattern matching and diagnose an occurrence situation of a failure. An administrator of the customer system 1 takes appropriate measures against a failure in the customer system 1 from the result of diagnosis of the event analyzing system 2.

Conventionally, there have been known methods for detecting an occurrence pattern of events. For example, R. Agrawal, R. Srikant, "Fast Algorithms for Mining Association Rules", Proceedings of the 20$^{th}$ International Conference on Very Large Databases, Santiago, Chile, September 1994 discloses an algorithm, so-called "a-priori", that detects an occurrence pattern of an event that occurs at a high frequency from an event log.

FIG. 18 is schematic for explaining the a-priori algorithm. Characters "A" to "D" in FIG. 18 represent individual events, and AB, ABC, or ABCD represents two, three, or four events.

In the a-priori algorithm, a candidate for an occurrence pattern of an event is produced by combining individual events, and only an occurrence pattern(s) of an event with a high occurrence frequency is detected by removing a pattern (s) of an event with a low occurrence frequency. Therefore, it is difficult to detect an occurrence pattern of such an event that, though an occurrence frequency is low but a serious accident or trouble may be caused.

Japanese Patent Application Laid-Open No. H10-134086 discloses a countermeasure of the drawbacks of the a-priori algorithm. What is disclosed is a casual event pair detecting device that finds possible events which may be an event pattern and determines whether two of the found events have causality using a statistical approach, so that an occurrence pattern of event pair that is considered to have a low occurrence frequency but a high relationship.

S. Ma, J. Hellerstein, "Mining Mutually Dependent Patterns", 2001 IEEE International Conference on Data Mining, San Jose, Calif., Nov. 29-Dec. 2, 2001 discloses a method for detecting a set of events that are thought to have a high relationship by calculating a conditional probability instead of detecting the occurrence pattern of events based upon an occurrence frequency.

However, the conventional techniques only detect a collection of events occurring with a high frequency or a simple collection of events having a high relationship among them as an occurrence pattern from an event log. In other words, in the conventional techniques it is difficult to strongly support a work for extracting further detailed information from the event log to allow an administrator to avoid an accident or a trouble in advance.

Specifically, information obtained by an administrator from the conventional technique is information on an event that has a high possibility that the event occurs in response to occurrence of another event, and there is a problem that it is difficult to provide detailed information to an occurrence pattern of an event in order to allow an administrator to handle an accident or a trouble more properly.

SUMMARY OF THE INVENTION

It is an object of the present invention to at least solve the problems in the conventional technology.

An apparatus according to an aspect of the present invention is for detecting an occurrence pattern. The apparatus includes a detecting unit that detects an occurrence pattern of an event from event data based upon information concerning plural kinds of relationships defined among events; and an outputting unit that outputs an occurrence pattern of an event detected at the detecting.

A method according to another aspect of the present invention is a method of detecting an occurrence pattern. The method includes detecting an occurrence pattern of an event from event data based upon information concerning plural kinds of relationships defined among events; and outputting an occurrence pattern of an event detected at the detecting.

A computer readable recording medium according to still another aspect of the present invention stores thereon a computer program that causes a computer to realize the above method according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a diagram for explaining advantages of the simplified processing of the event pattern rule;

FIG. 10 is a combination table storing a relationship between rules having a predetermined relationship and combinable rules;

FIG. 18 is a schematic for explaining the a-priori algorithm.

DETAILED DESCRIPTION

Exemplary embodiments of an apparatus, a method, and a computer product according to the present invention will be explained below in detail with reference to the accompanying drawings.

Figure 1:
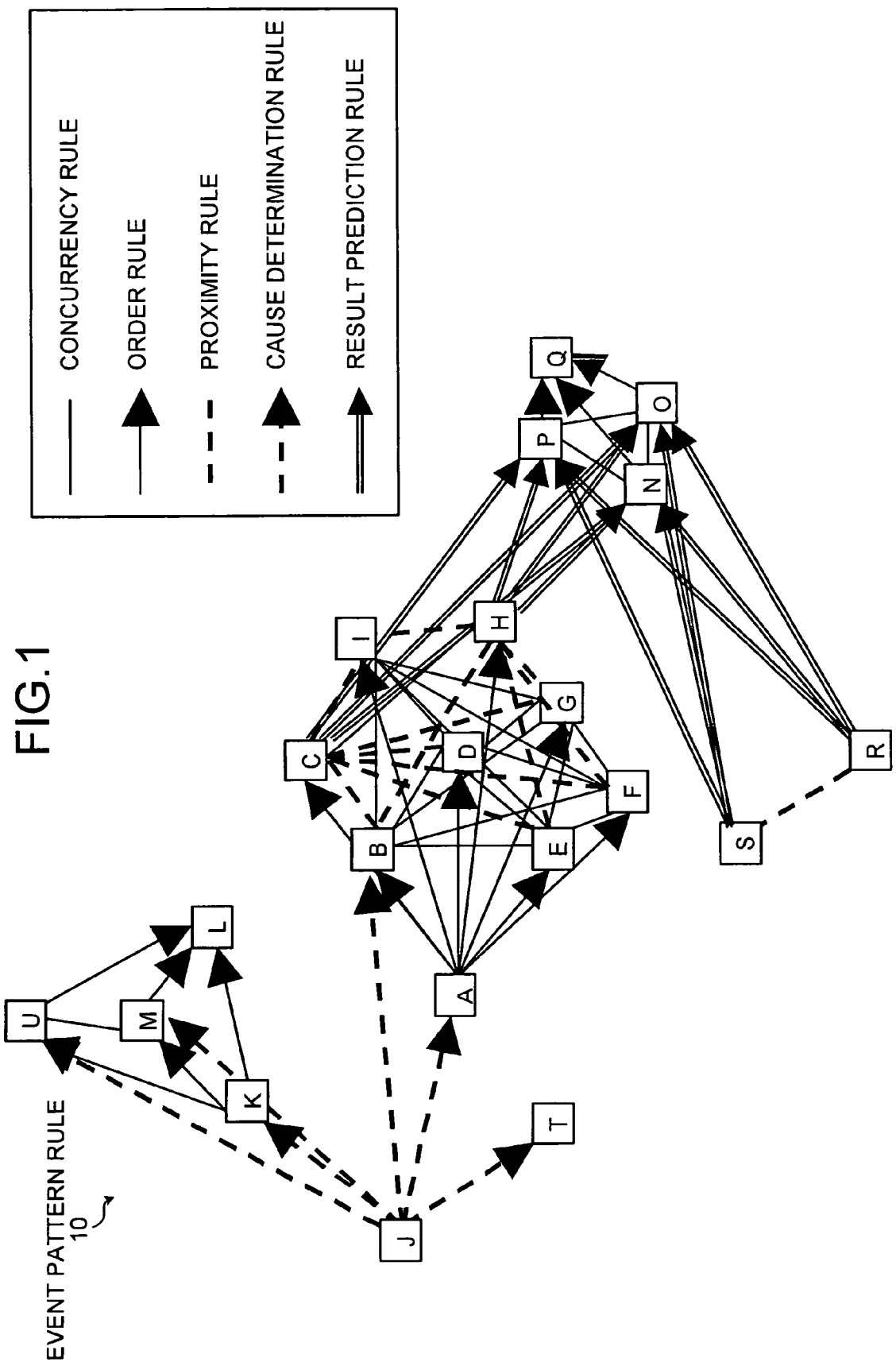
FIG. 1 is a diagram for explaining a concept of a pattern detecting processing according to an embodiment of the present invention.

FIG. 1 is a schematic for explaining the concept of a pattern detecting processing according to an embodiment of the present invention. As shown in FIG. 1, an event pattern rule 10 is prepared from an event log recording events that have occurred.

The event pattern rule 10 means an occurrence pattern of events where events that are thought to have any relationship among them have been extracted from an event log. The event pattern rule 10 is used to detect an occurrence of a system failure or the like in advance through correlation with an event collection recorded in an event log. A management efficiency of a system can be supported by performing the pattern detecting processing.

The event pattern rule 10 includes nodes (apexes) A to T and edges (sides) connecting each of the nodes A to T to another thereof. The nodes A to T represent occurred events, respectively.

The edges represent a relationship among the nodes A to T, and they include a concurrency rule, an order rule, a proximity rule, a cause determination rule, and a result prediction rule. Each of the concurrency rule and the proximity rule is represented by an undirected edge, and each of the order rule, the cause determination rule, and the result prediction rule is represented by a directed edge.

The concurrency rule represents a relationship indicated by a solid line, and means that events connected by a solid line occur simultaneously. The order rule represents a relationship indicated by a solid line arrow, and means that events sequentially occur in a direction of the arrow. The proximity rule represents a relationship indicated by a dotted line, and means that occurrence times of respective events connected by a dotted line approximate to one another.

The cause determination rule represents a relationship indicated by a dotted line arrow, and means that, before an event positioned at a distal end of the arrow occurs, an event positioned at a proximal end of the arrow occurs. The result prediction rule represents a relationship indicated by a double line arrow, and means that, after the event positioned at the proximal end of the arrow occurs, the event positioned at the distal end thereof occurs.

Thus, an event pattern rule is prepared from an event log by using the relationship among a plurality of events of the concurrency rule, the order rule, the proximity rule, the result prediction rule, and the cause determining rule, detailed information on a relationship among events in an occurrence pattern of event can be extracted from the event log.

Besides, the pattern detecting processing has such advantages or merits that an occurrence pattern of an event occurring with a low frequency, which can not be detected by the a-priori algorithm, can be detected, an occurrence pattern that is difficult to detect conventionally can be detected easily, and an occurrence pattern including three or more events can be detected fast. In the following, features of the pattern detecting processing having such merits will be explained in detail.

The terms used in this text will be explained in detail. The term "event" is an event that has occurred in a customer system, and the event is associated with an occurrence time, an event kind, and information on attribute. Here, the occurrence time is a time at which an event has occurred. The event kind is identification information for identifying the kind of an event occurring. The attribute is information on other additional information on the event. Accumulation or collection of such information pieces of event is "event log".

The term "time constraint" is a condition for defining substantial co-occurrence of events. Specifically, the term "time constraint" is a condition used for determining whether an occurrence time t1 of one event and an occurrence time t2 of another event are near to each other. This condition is expressed by a numerical expression as follows:

$$t1+ts \leq t2 \leq t1+te$$

Here, the "ts" and "te" are predetermined times defining nearness in occurrence time between two events. For example, when two events occur within 300 seconds, ts=−300 seconds and te=300 seconds are obtained. Hereinafter, the time constraint represented by the above numerical expression is expressed as Ft (t1, t2).

The term "co-occurrence probability condition" is a condition for defining events that co-occur substantially like the time constraint. Specifically, a probability that, when any event belonging to category c1 has occurred at a time t1, any event belonging to category c2 occurs at a time t2 satisfying the time constraint Ft (t1, t2) is called as an co-occurrence probability of the event belonging to category c1 and the event belonging to category c2, and expressed as P(c1, c2).

The "co-occurrence probability condition" is defined using a numerical expression as follows:

$$P(c1, c2) \geq minconf$$

Here, minconf is a constant satisfying $0 \leq minconf \leq 1$, and is called "minimum confidence factor".

The "substantial co-occurrence" of the event belonging to category c1 and the event belonging to category c2 means a case that the event belonging to category c2 and the event belonging to category c1 satisfy both of the "time constraint" and the "co-occurrence probability condition". Hereinafter, a co-occurrence probability between an event belonging to category c1 and an event belonging to category c2 is expressed as follows:

$$P(c1, c2, Ft)$$

Here, assuming that the number of occurrences of an event belonging to category c1 is expressed as N (c1) and the number of occurrences of an event belonging to category c2 occurring at the time t2 satisfying the time constraint of Ft (t1, t2) when the event belonging to category c1 has occurred is expressed as N (c1, c2, Ft), the co-occurrence probability P(c1, c2, Ft) can be expressed as follows:

$$P(c1, c2, Ft)=N(c1, c2, Ft)/N(c1)$$

Since the time constraint Ft (t1, t2) is defined with "ts" and "te", the co-occurrence probability P(c1, c2, Ft) can be expressed as follows:

$$P(c1, c2, Ft)=N(c1, c2, Ft)/N(c1)=N(c1, c2, ts, te)/N(c1)=P(c1, c2, ts, te)$$

When an occurrence pattern of "substantially co-occurring" events is detected using the co-occurrence probability P(c1, c2, Ft), a reliability of the co-occurrence probability P(c1, c2, Ft) calculated such that the number of occurrences N (c1) of the event belonging to category c1 is extremely small is low. Therefore, an occurrence pattern relating to the event belonging to category c1 falling under N (c1)<minsup is removed. Here, the "minsup" is a predetermined threshold.

Next, the relationship among the "simultaneity rule", the "order rule", the "proximity rule", the "cause determination rule", and the "result prediction rule" explained first will be explained in further detail. In the following, it is assumed that "w" is a limiting value of a time interval where events can be considered to have a relationship among them, and "e" is an allowable limiting value of time deviation set considering a measurement error at a time of event occurrence or a measurement accuracy of a time. The "w" and "e" have a relationship of $0 \leq e \leq w$.

The "simultaneity rule" represents a relationship between an event belonging to category c1 and an event belonging to category c2 occurring simultaneously. The simultaneity rule is expressed using numerical expressions as a relationship between events satisfying $$P(c1, c2, -e, e) \geq \text{minconf, and}$$

$$P(c2, c1, -e, e) \geq \text{minconf.}$$

The "order rule" represents a relationship between an event belonging to category c1 and an event belonging to category c2 that occur sequentially. The order rule is expressed using numerical expressions as a relationship between events satisfying, of events that do not satisfy the condition for the simultaneity rule, $$P(c1, c2, -e, w) \geq \text{minconf, and}$$

$$P(c2, c1, -w, e) \geq \text{minconf.}$$

The "proximity rule" represents a relationship between an event belonging to category c1 and an event belonging to category c2 that occur at times near to each other regardless of their order. The proximity rule is expressed using numerical expressions as a relationship between events satisfying, of events that do not satisfy the condition for the order rule, $$P(c1, c2, -w, w) \geq \text{minconf, and}$$

$$P(c2, c1, -w, w) \geq \text{minconf.}$$

The "cause determination rule" represents a relationship between an event belonging to category c1 and an event belonging to category c2 that where, before the event belonging to category c2 occurs, the event belonging to category c1 occurs. The cause determination rule is expressed using a numerical expression as a relationship between events satisfying, of events that do not satisfy the condition for the order rule, $$P(c2, c1, -w, e) \geq \text{minconf.}$$

The "result prediction rule" represents a relationship between an event belonging to category c1 and an event belonging to category c2 where, after the event belonging to category c1 occurs, the event belonging to category c2 occurs. The result prediction rule is expressed using a numerical expression as a relationship between events satisfying, of events that do not satisfy the condition for the order rule, $$P(c1, c2, -e, w) \geq \text{minconf.}$$

In the pattern detecting processing, when a pair (c1, c2) of an event belonging to category c1 and an event belonging to category c2 satisfies either of the simultaneity rule, the order rule, the proximity rule, the cause determination rule, or the result prediction rule described above, the pair (c1, c2) of events is extracted as a pair rule satisfying a predetermined connection relationship.

Figure 2:
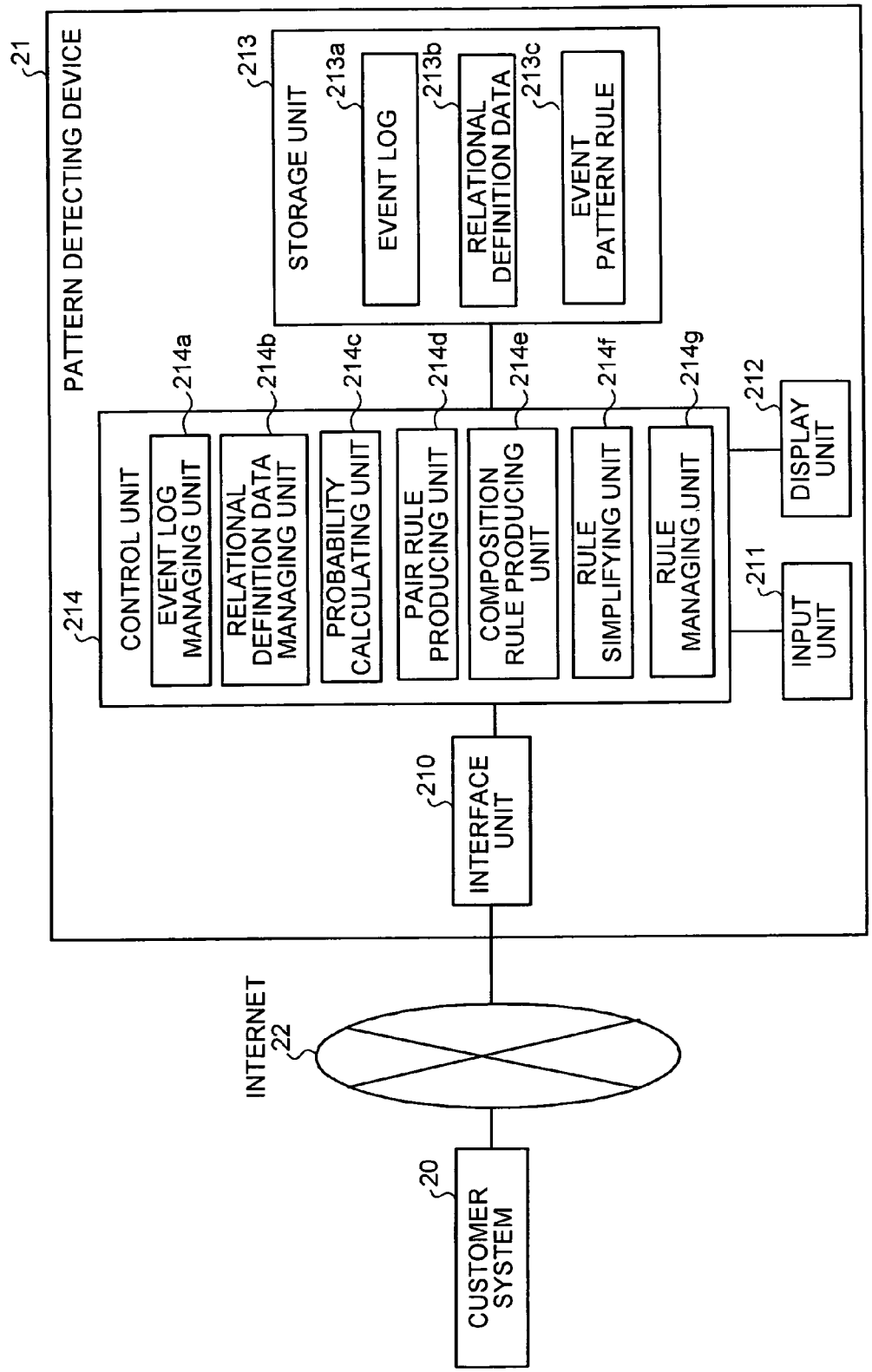
FIG. 2 is a block diagram of a pattern detecting device according to an embodiment of the present invention.

Next, a functional configuration of the pattern detecting device according to the embodiment of the present invention will be explained. FIG. 2 is a block diagram of a pattern detecting device 21 according to the embodiment of the present invention. The pattern detecting device 21 is connected to a customer system 20 via Internet 22.

Occurrence of a failure in the customer system 20 is predicted or detected based on an analysis of an event log. The customer system 20 records information on an event that has occurred as an event log to transmit the same to the pattern detecting device 21.

The pattern detecting device 21 is a device that detects an occurrence pattern of an event that is thought as a sign of occurrence of a failure as the event pattern rule from the event log received from the customer system 20 to support a managing work on the customer system 20. The pattern detecting device 21 has an interface unit 210, an input unit 211, a display unit 212, a storage unit 213, and a control unit 214.

The interface unit 210 is a network interface that performs transmission/reception of data to/from the customer system 20 via Internet 22. The input unit 211 is an input device such as a keyboard or a mouse. The display unit 212 is a display device such as a display.

The storage unit 213 is a storage device such as a hard disc device. The storage unit 213 stores an event log 213a, relational definition date 213b and an event pattern rule 213c therein.

The event log 213a is a log obtained by accumulating information pieces on events that have occurred in the customer system 20 and is received from the customer system 20. The relational definition data 213b is data storing or including definition expressions that define relationships among events regarding the simultaneity rule, the order rule, the proximity rule, the cause determination rule, and the result prediction rule, and various set values such as "w", "e", and minconf. The event pattern rule 213c is data storing event pattern rules detected.

The control unit 214 is a controller that controls the pattern detecting device 21 as a whole. The control unit 214 has an event log managing unit 214a, a relational definition data managing unit 214b, a probability calculating unit 214c, a pair rule producing unit 214d, a composition rule producing unit 214e, a rule simplifying unit 214f, and a rule managing unit 214g.

The event log managing unit 214a performs a processing for acquiring an event log from the customer system 20 to store the same in the storage unit 213 as the event log 213a. The event log managing unit 214a performs such a processing as to, when an event pattern rule is detected, detect whether a pattern matching with the event pattern rule is present in the event log acquired from the customer system 20 and, when a similar pattern is detected, output an alarm message.

The relational definition data managing unit 214b receives input of definition expressions that define relationships among events regarding the simultaneity rule, the order rule, the proximity rule, the cause determination rule, and the result prediction rule, and various set values such as "w", "e", and minconf from an administrator of the customer system 20 to store them in the storage unit 213 as the relational definition data 213b.

The probability calculating unit 214c calculates a co-occurrence probability P(c1, c2, ts, te) defining a relationship among events. Specifically, the probability calculating unit 214c calculates the co-occurrence probability P(c1, c2, ts, te) by calculating the number N (c1) of occurrences of an event belonging to category c1 and the number N (c1, c2, ts, te) of occurrences of an event belonging to category c2 when the event belonging to category c1 occurs.

The pair rule producing unit 214d performs a processing for extracting a pair of events having a predetermined relationship therebetween from the event log as a pair rule based upon the information on the co-occurrence probability P(c1, c2, ts, te) calculated in the probability calculating unit 214c.

Specifically, the pair rule producing unit 214d acquires a pair of two any events from the event log to examine whether the acquired pair of events satisfies the condition for either of the simultaneity rule, the order rule, the proximity rule, the cause determination rule, and the result prediction rule and, when the acquired pair of events satisfies the condition, extract the pair of events as a pair rule corresponding to the condition. The pair rule producing unit 214d continue to perform the processing until a processing for unexamined pairs of event is completed.

The composition rule producing unit 214e connects pair rules produced in the pair rule producing unit 214d to produce an event pattern rule including three or more pairs of events. Specifically, the composition rule producing unit 214e produces a rule including sum of sets of events included in a pair rule A and events of included in a pair rule B, and sum of sets of a relationship between two events in the pair rule A and a relationship between two events in the pair rule B.

The composition rule producing unit 214e connects pair rules or rules until processing for connectable pair rules or rules are completed, thereby producing an event pattern rule obtained by connecting three or more events such as shown in FIG. 1.

Connection of pair rules or rules can be performed even between pair rules or rules having a different relationship therebetween, such as connection of the simultaneity rule and the order rule, as shown as one example in FIG. 1. A pair rule that can not be connected with another pair rule is set as an event pattern rule constituted of two events by the composition rule producing unit 214e.

The rule simplifying unit 214f performs a processing for simplifying an event pattern rule produced by the composition rule producing unit 214e to allow a person's easy understanding. Specifically, the rule simplifying unit 214f produces a graph where events included in an event pattern rule are represented with nodes and relationships between events are represented with edges.

The rule simplifying unit 214f extracts strong connected components constituted of a plurality of nodes to perform a processing for integrating the strong connected components to one node. Here, the strong connected component means a set or collection of nodes that can reach each other when tracing an edge connecting the nodes.

Figure 3:
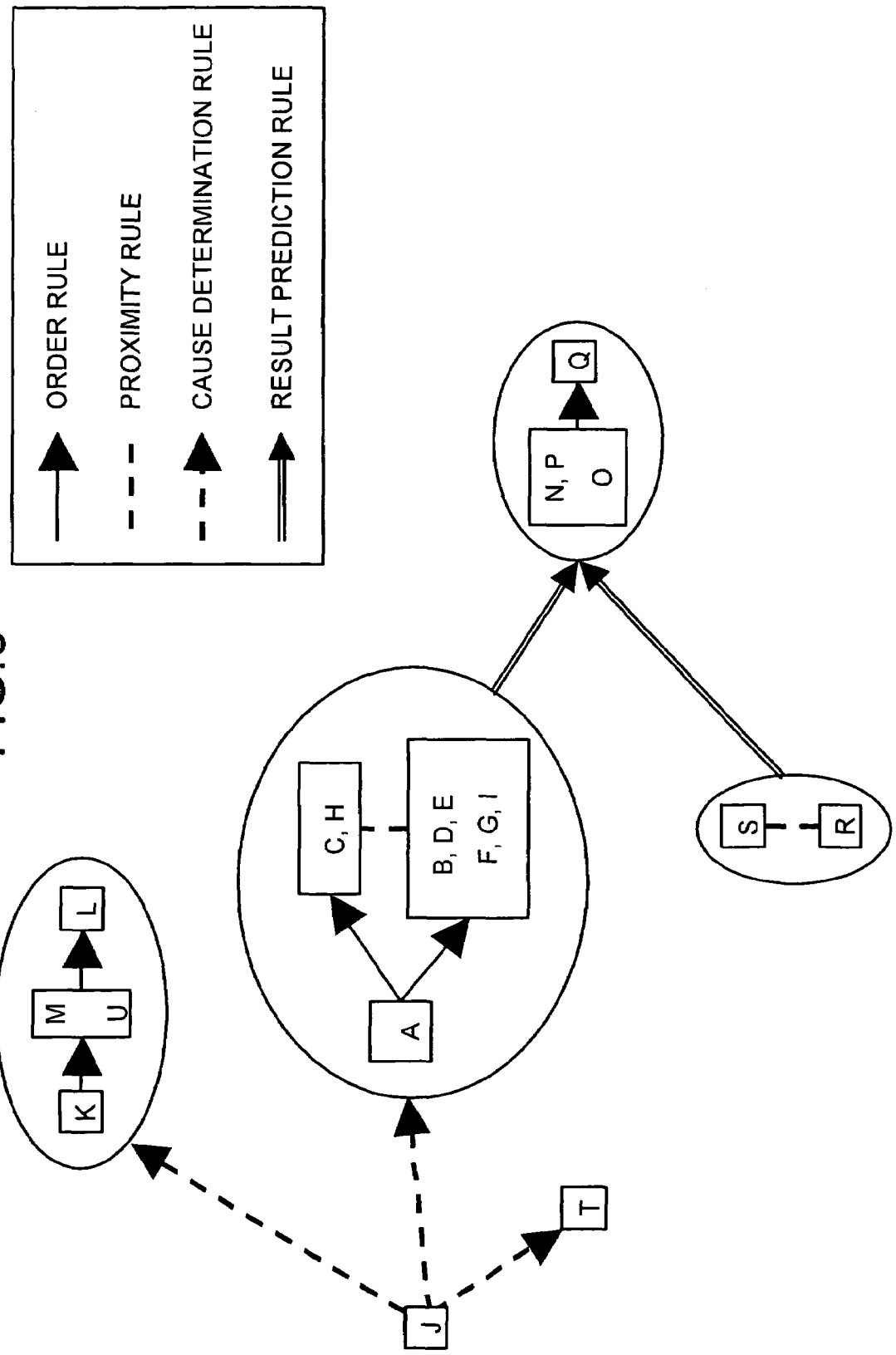
FIG. 3 is a diagram for explaining a simplified processing of an event pattern rule.

FIG. 3 is a simplified representation of an event pattern rule. In other words, the event pattern rule 10 is shown in a simplified manner in FIG. 3. The rule simplifying unit 214f extracts nodes connected based upon the simultaneity rule (a solid line in FIG. 1) as the strong connected components to integrate them as one component. For example, as shown in FIG. 3, since the node B, the node D, the node E, the node F, the node G and the node I in FIG. 1 are the strong connected components, they can be integrated in one component.

The rule simplifying unit 214f applies a transitive reduction to a set of nodes connected according to the order rule included in the event pattern rule. The transitive reduction is a processing that, when there is a plurality routes from a node A to a node B, replacing the routes with one route allowing arrival from any node in the routes to the node B to integrate the routes.

In the embodiment shown in FIG. 1, the node K and the node M, the node M and the node L, and node K and the node L have the relationship of the order rule, where there are a route directly reaching the node L from the node K and a route tracing the node K, the node M, and the node L. As shown in FIG. 3, however, the two routes are integrated to one route that allows arrival from any node in the two routes to the node L, that is, a route tracing the node K, the node M, and the node L in this case.

The event pattern rule can be simplified by applying the transitive reduction without omitting information on the occurrence order of events indicated by the order rule even about an event in a midway of a route.

Thereafter, the rule simplifying unit 214f adds the relationship of the order rule, the relationship of the proximity rule, the relationship of cause determination rule, and the relationship of the result prediction rule that have not been applied with the simplifying processing to the event pattern rule where a connection relationship of the simultaneity rule and the order rule has been simplified to produce a final event pattern rule.

The simplifying processing for the event pattern rule becomes more effective according to increase in the number of events included in the event pattern rule. FIG. 4 is a schematic for explaining the advantage or merit of the simplified event pattern rule.

As shown on an event pattern rule 40 before the simplifying processing in FIG. 4, when the number of events included in the event pattern rule is large, it is difficult to grasp relationships among respective events. However, as shown on an event pattern rule 41 which has been subjected to the simplifying processing, after the simplifying processing is performed, an administrator for the customer system 20 can grasp a useful rule or a new occurrence pattern of an event which has not been confirmed yet to utilize knowledge thereabout for a managing work for the customer system 20.

Returning back to FIG. 2, the rule managing unit 214g performs a processing for storing an event pattern rule produced in the composition rule producing unit 214e or an event pattern rule simplified in the rule simplifying unit 214f in the storage unit 213 output the same to the display unit 212 or the like.

When an event pattern rule such as shown in FIG. 3 is output to the display unit 212, the rule managing unit 214g outputs an event pattern rule according to a graph rendering method such as a magnetic spring model.

Next, the processing procedure for the pattern detecting processing according to a first embodiment will be explained.

Figure 5:
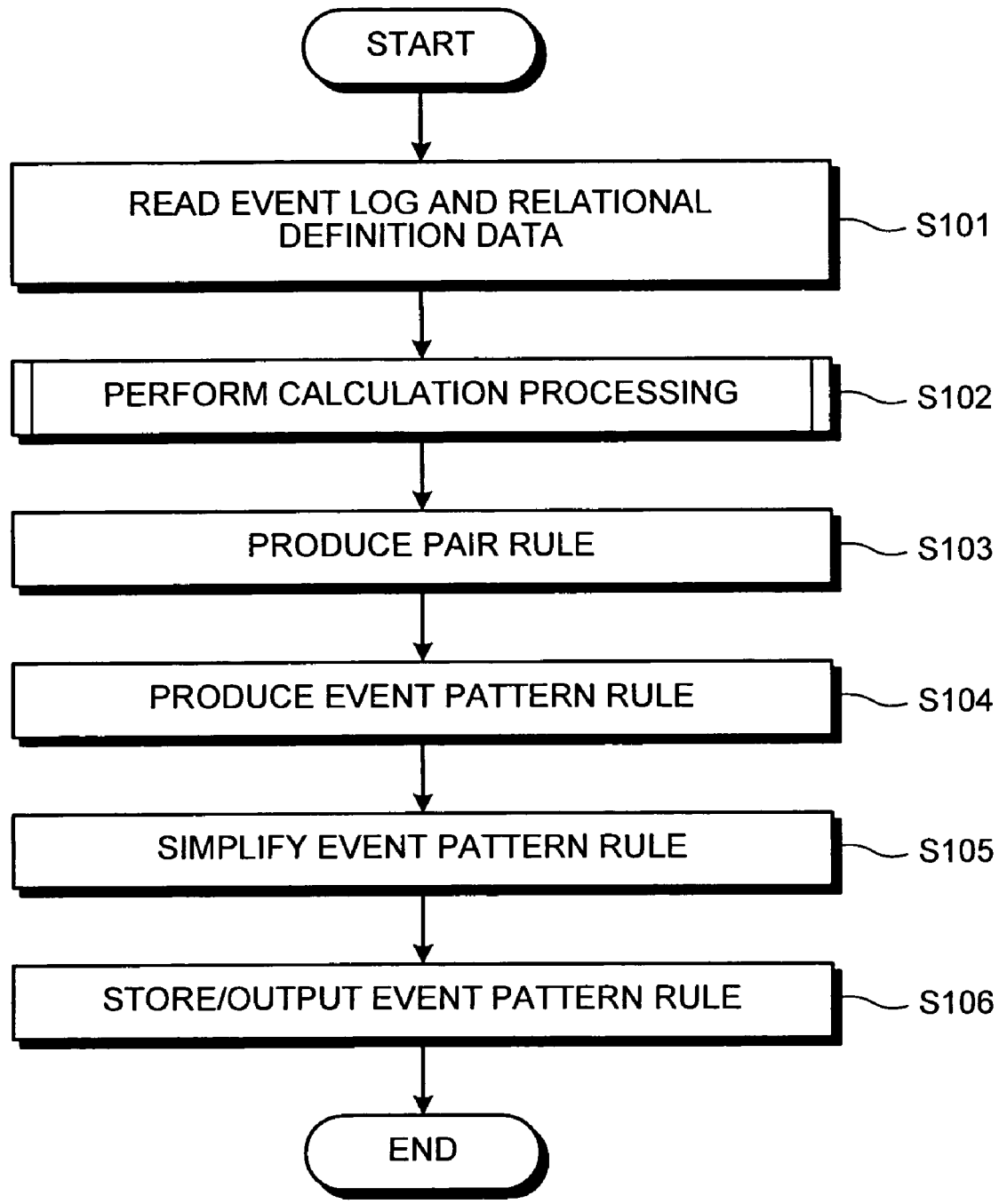
FIG. 5 is a flowchart of a processing procedure of a pattern detecting processing according to a first embodiment.

FIG. 5 is a flowchart of a processing procedure of the pattern detecting processing according to the first embodiment. In the first embodiment, the probability calculating unit 214c of the pattern detecting device 21 reads the event log 213a and the relational definition data 213b stored in the storage unit 213 (step S101) and calculates an co-occurrence probability P(c1, c2, ts, te) of an event from the read event log 213a (step S102).

The pair rule calculating unit 214d then performs a processing for producing a pair rule from the co-occurrence probability P(c1, c2, ts, te) calculated in the probability calculating unit 214c and the relational definition data 213b (step S103).

Thereafter, the composition rule producing unit 214e connects connectable pair rules to produce an event pattern rule (step S104), and the rule simplifying unit 214f performs a processing for simplifying the event pattern rule produced in the composition rule producing unit 214e (step S105).

The rule managing unit 214g performs a processing for storing the event pattern rule in the storage unit 213 to output the same to the display unit 212 (step S106) and terminate the pattern detecting processing.

Figure 6:
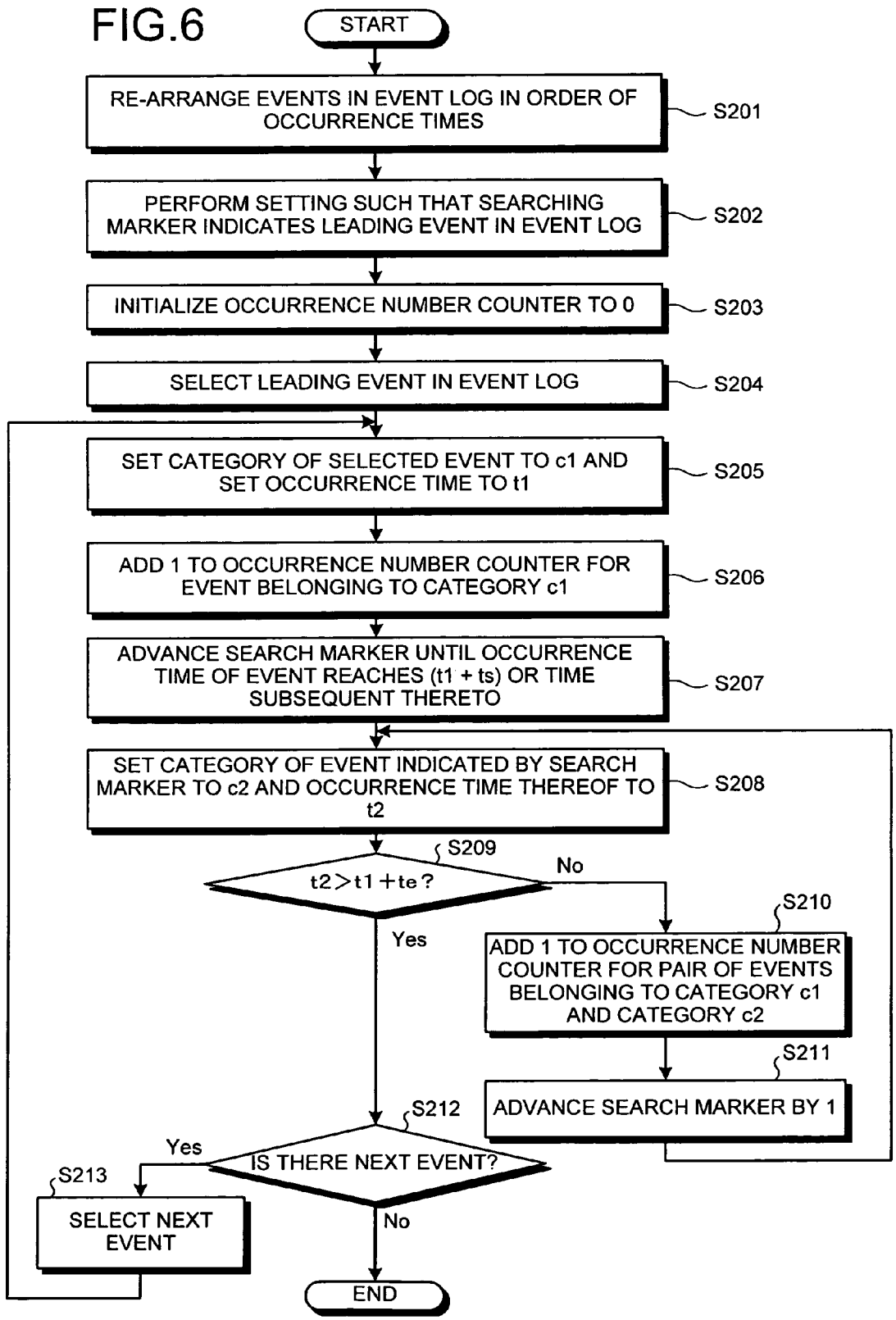
FIG. 6 is a flowchart of a processing procedure of a calculating processing of the number of occurrences N (c1) and N (c1, c2, ts, te) of an event.

Next, a processing for calculating the numbers of event occurrences N (c1) and N (c1, c2, ts, te) (hereinafter, "calculation processing"), which the probability calculating unit 214c uses in calculation for the co-occurrence probability P(c1, c2, ts, te), will be explained in the step S102 for the pattern detecting processing shown in FIG. 5. FIG. 6 is a flowchart of the calculation processing.

As shown in FIG. 6, first, the probability calculating unit 214c of the pattern detecting unit 21 performs a processing for re-arranging events included in the event log in the order of occurrence time (step S201). The probability calculating unit 214c performs such setting that a search marker indicates an event positioned at a head of the event log re-arranged (step S202) and further initializes a value in a counter for counting the number of event occurrences to 0 (step S203).

Subsequently, the probability calculating unit 214c selects the event at the head of the event log (step S204) to set the kind and the occurrence time of the selected event to c1 and t1 (step S205). Thereafter, the probability calculating unit 214c performs a processing for adding 1 to an occurrence number counter for an event belonging to category c1 (step S206). The value of the occurrence number counter is a value in N (c1).

After advancing the search marker until the search marker indicates an event having an occurrence time of (t1+ts) or subsequent thereto (step S207), the probability calculating unit 214c performs a processing for setting the kind and the occurrence time of the event indicated by the search marker to c2 and t2 (step S208). Here, ts is a threshold ts in the time constraint (t1+ts≦t2≦t1+te).

Thereafter, the probability calculating unit 214c examines whether t2 is larger than (t1+te) (step S209). Here, te is a threshold te in the time constraint (t1+ts≦t2≦t1+te).

When t2 is not larger than t1+te (step S209, No), the probability calculating unit 214c adds 1 to the occurrence number counter for a pair of events belonging to category c1 and category c2 (step S210), advances the search marker by one such that the marker indicates the next event (step S211). The probability calculating unit 214c then proceeds to step S208 and continues to perform a processing for steps subsequent thereto. The value of the occurrence number counter for the pair of events is a value in N (c1, c2, ts, te).

When t2 is larger than (t1+te) (step S209, Yes), the probability calculating unit 214c examines whether the next event to be selected is present in the event log (step S212), and when the next event is present (step S212, Yes), the probability calculating unit 214c selects the next event (step S213). The probability calculating unit 214c proceeds to step S205 and continues to perform a processing for steps subsequent thereto.

When the next event to be selected is not present in the event log (step S212, No), the calculation processing is terminates as it is.

The probability calculating unit 214c calculates, based on the results of calculation processing, the value of the occurrence probability P(c1, c2, ts, te) according to the equation $$P(c1, c2, ts, te) = N(c1, c2, ts, te)/N(c1).$$

Figure 7:
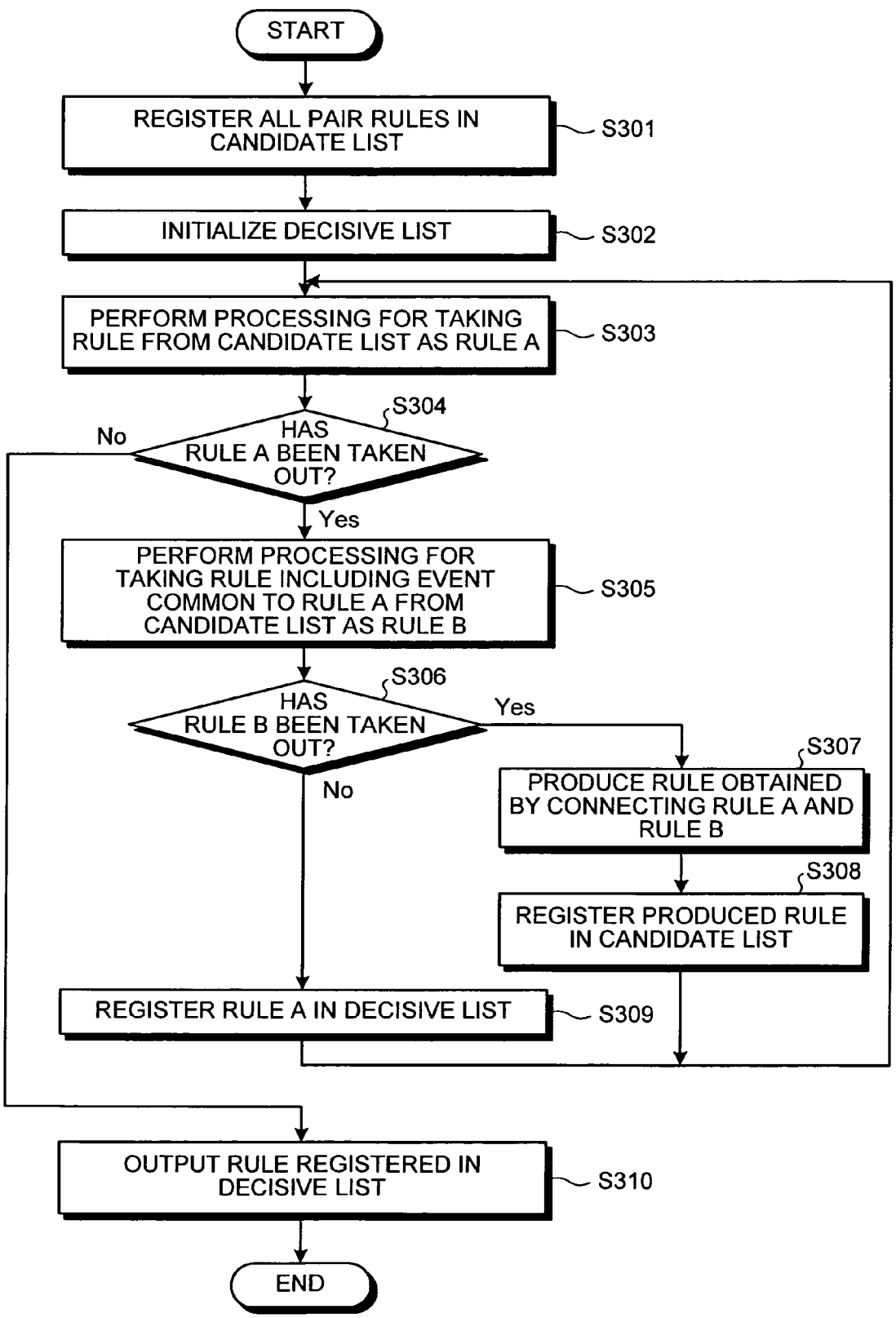
FIG. 7 is a flowchart of a processing procedure of a processing for producing an event pattern rule by a combination of pair rules.

Next, how the composition rule producing unit 214e connects pair rules to produce an event pattern rule by connecting in the step S104 for the pattern detecting processing shown in FIG. 5 will be explained. FIG. 7 is a flowchart of a processing for producing an event pattern rule by combining pair rules.

As shown in FIG. 7, first, the composition rule producing unit 214e of the pattern detecting unit 21 registers all pair rules in a candidate list registering rules (step S301). The composition rule producing unit 214e empties a decisive list registering produced event pattern rules to initialize the same (step S302).

Subsequently, the composition rule producing unit 214e performs a processing for taking a rule (including a pair rule) out of the candidate list as a rule A (step S303) and examines whether the rule A has been taken out (step S304). When the rule A has not been taken out (step S304, No), the composition rule producing unit 214e outputs the rule registered in the decisive list (step S310) to terminate the processing for producing an event pattern rule.

When the rule A has been taken out (step S304, Yes), the composition rule producing section 214e performs a processing for taking a rule including an event common to the rule A from the candidate list as a rule B (step S305) and examines whether the rule B has been taken out (step S306).

When the rule B has not been taken out (step S306, No), the composition rule producing unit 214e registers the rule A in the decisive list (step S309). The composition rule producing unit 214e then proceeds to step S303 to continue to perform a processing for steps subsequent thereto.

When the rule B has been taken out (step S306, Yes), the composition rule producing unit 214e produces a rule obtained by connecting the rule A and the rule B (step s307) to register the produced rule in the candidate list (step S308). The composition rule producing unit 214e proceeds to step S303 to continue to perform a processing for steps subsequent thereto.

Figure 8:
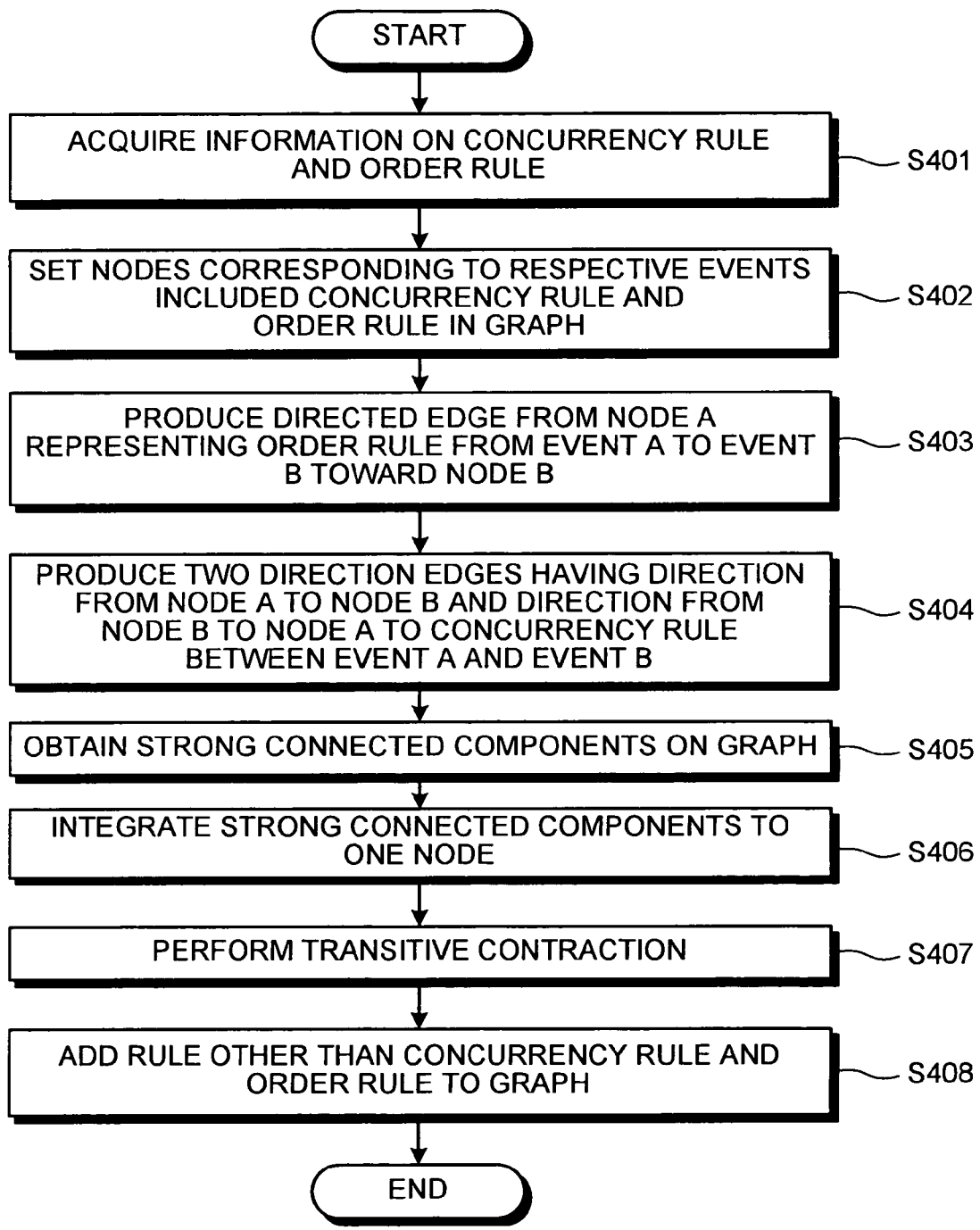
FIG. 8 is a flowchart of a processing procedure of a processing for simplifying an event pattern rule.

Next, how the rule simplifying unit 214f simplifies an event pattern rule in step S105 for the pattern detecting processing shown in FIG. 5 will be explained. FIG. 8 is a flowchart of a processing procedure of a processing for simplifying an event pattern rule.

As shown in FIG. 8, first, the rule simplifying unit 214f of the pattern detecting device 21 acquires information on the order rule and the simultaneity rule in the event pattern rule produced by the composition rule producing unit 214e (step S401). The rule simplifying unit 214f sets nodes corresponding to respective events included in the order rule and the simultaneity rule in a graph (step S402).

Thereafter, the rule simplifying unit 214f produces a directed edge having a direction from a node A corresponding to a event A to a node B corresponding to another event B to the order rule having an order from the event A to the event B (step S403). The rule simplifying unit 214f also produces two directed edges having a direction from the node A to the node B and a direction from the node B to the node A to the simultaneity rule between the event A and the event B (step S404).

Subsequently, the rule simplifying unit 214f performs a processing for obtaining strong connected components on a graph where the order rule and the simultaneity rule are represented using the directed edges (step S405), and performs a processing for integrating the strong connected components obtained to one node (step S406).

Further, the rule simplifying unit 214f performs a transitive reduction of the graph, and performs a processing for, when a plurality of routes from the node A to the node B are present, replacing the routes with one route allowing arrival from any node in the routes to the node B to perform a route integration (step S407). Regarding the order rule to which the transitive reduction has not been applied, the setting of the directed edge is maintained as it is.

Thereafter, the rule simplifying unit 214f terminates a processing for adding the rules expect for the order rule and the simultaneity rule, namely, the proximity rule, the cause determination rule and the result prediction rule (step S408) to simplify the event pattern rule.

As described above, in the first embodiment, the probability calculating unit 214c and the pair rule producing unit 214d detect an event pattern rule and output the detected event pattern rule. The event pattern rule is detected based on an event log based upon information on plural kinds of relationships defined among events, such as the simultaneity rule, the order rule, the proximity rule, the cause determination rule, and the result prediction rule. As a result, detailed information on an occurrence pattern of an event can be extracted from the event log.

Moreover, the information on the plural kinds of relationships is information defined based upon the occurrence times of events and the occurrence probabilities of the events. As a result, the relationship between events can be set flexibly based upon occurrence times of the events and occurrence probabilities of the events. Moreover, detailed information on an occurrence pattern of an event can be extracted.

Furthermore, the information on the plural kinds of relationships includes information where relationships between events are classified into the simultaneity rule and the proximity rule and defined according to a degree of a difference in occurrence time between two events. As a result, detailed information on the occurrence pattern can be extracted.

Moreover, the composition rule producing unit 214e detects an event pattern rule including three or more events by connecting pair rules including two events. As a result, an occurrence pattern including three or more events can be detected efficiently.

Furthermore, the rule simplifying device 214f integrates relationships between events included in a detected event pattern rule based upon information on a relationship between events included in an event pattern rule to output the event pattern rule having the integrated relationships between event, a complicated relationship between events is simplified so that information that the administrator for the customer system 20 can understand easily can be provided.

In the first embodiment, an event pattern rule is prepared by connecting pair rules. As another approach, it may be whether connection of pair rules are valid, and only an even pattern rule constituted of connection of valid pair rules is output. This approach will be explained below in detail as a second embodiment of the present invention.

In the second embodiment, the composition rule producing unit 214e of the pattern detecting device 21 determines whether connection of rules is valid based upon a connection condition preliminarily defined before connection of rules, and performs connection of rules, when an affirmative determination is made.

For example, it is assumed that a pair rule (A, B) including an event belonging to category A and an event belonging to category B, a pair rule (B, C) including an event belonging to category B and an event belonging to category C, a pair rule (C, D) including an event belonging to category C and an event belonging to category D, and a pair rule (D, E) including an event belonging to category D and an event belonging to category E are present and these pair rules are produced under such a condition that the minimum confidence factor minconf is 0.9.

When the pair rules are connected and a rule including five events of (A, B, C, D, E) is produced, a co-occurrence probability between the event A and the event E becomes so small as $0.9^4=0.6561$, which results in reduction in validity of a rule.

Therefore, such a connection condition that "a co-occurrence probability at a time of connection is equal to or more than 0.7" is defined in advance and only rules satisfying this connection condition are connected. In this case, step S305 in FIG. 7 is modified as "performing a processing for taking a rule including an event common to the rule A and satisfying a predetermined connection condition with the rule A out of the candidate list as a rule B".

By performing connection only between rules satisfying a connection condition in this manner, only an event pattern rule useful for an administrator for the customer system 20 can be extracted.

In the above processing, connection is performed only between rules satisfying a connection condition, but a portion of an event pattern rule which does not satisfy the connection condition may be deleted after performing the connection processing for the rules.

Figure 9:
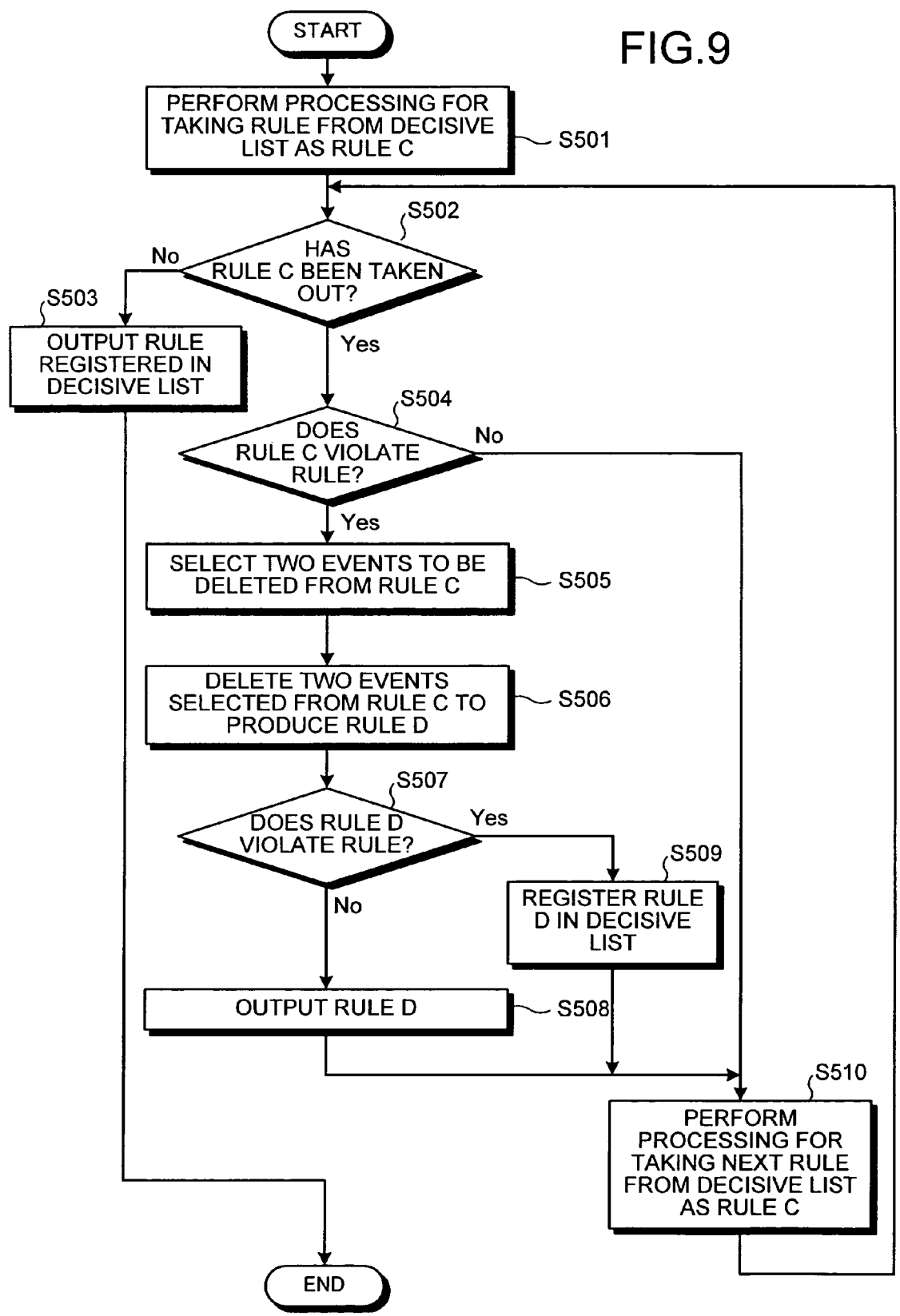
FIG. 9 is a flowchart of a processing procedure of a processing for deleting a rule portion of a rule violation from the event pattern rule.

FIG. 9 is a flowchart of a processing procedure for deleting a rule portion of a rule violation from an event pattern rule. The processing is a processing performed instead of step S310 in FIG. 7.

A shown in FIG. 9, first, the composition rule producing unit 214e of the pattern detecting device 21 shown in FIG. 2 performs a processing for taking a rule from the decisive list as a rule C (step S501) to examine whether the rule C has been taken out (step S502).

When the rule C has not been taken out (step S502, No), the composition rule producing unit 214e outputs a rule registered in the decisive list (step S503) to terminate the processing for deleting the rule portion of the rule violation.

When the rule C has been taken out (step S502, Yes), the composition rule producing unit 214e examines whether the rule C constitutes the rule violation (step S504), and when the rule C does not constitute the rule violation (step S504, No), the composition rule producing unit 214e performs a processing for taking the next rule from the decisive list as the rule C (step S510). The composition rule producing unit 214e then proceeds to step S502 to continue to perform a processing for steps subsequent thereto.

When the rule C constitutes the rule violation (step S504, Yes), the composition rule producing unit 214e selects two events to be deleted of two events included in the rule C and having a relationship therebetween (step S505). Specifically, when deletes two events included in the rule C from the rule C, the composition rule producing unit 214e performs deletion of two events such that the degree of rule violation in the rule C is reduced to the minimum.

Thereafter, the composition rule producing unit 214e deletes the selected two events from the rule C to produce a rule D (step S506) and performs a processing for examining whether the rule D constitutes a rule violation (step S507).

When the rule D does not constitute the rule violation (step S507, No), the composition rule producing unit 214e outputs the rule D (step S508). The composition rule producing unit 214e proceeds to step S510 to continue to perform a processing for steps subsequent thereto. When the rule D constitutes the rule violation (step S507, Yes), the composition rule producing unit 214e registers the rule D in the decisive list (step S509). The composition rule producing unit 214e then proceeds to step S510 to continue to perform a processing for steps subsequent thereto.

By deleting a portion of an event pattern rule which does not satisfy the rule, only an event pattern rule useful for an administrator for the customer system 20 can be extracted.

As described above, when whether connection of rules is valid is determined based upon the connection condition or the rule, a practical problem may occur due to increase in calculation volume required for determination about the connection condition or the rule. Therefore, such a constitution may be employed that the information on the rules having predetermined relationships and the relationships between connectable rules is stored in advance and connections between rules are performed based upon the information.

FIG. 10 is a diagram of one example of a connection table on which rules having predetermined relationships and relationships between connectable rules are stored. As shown in FIG. 10, in this example, such a setting is performed that rules having connection relationships of the simultaneity rule, the order rule, and the proximity rule are connectable.

However, the rule having a relationship of the result prediction rule may be connected to the rules having relationship of the simultaneity rule, the order rule, the proximity rule and the result prediction rule, but a connection thereof with the cause determination rule is prohibited.

Similarly, the rule having a relationship of the cause determination rule is connectable to rules having relationships of the simultaneity rule, the order rule, the proximity rule, and the cause determination rule, but connection thereof with the result prediction rule is prohibited.

By storing information on the relationships of connectable rules in advance and restricting candidates of rules to be connected based upon the information in this manner, connection between rules can be performed at a fast speed.

As described above, in the second embodiment, the composition rule producing unit 214e determines whether connection of rules is performed based upon the connection conditions about whether connection of rules is allowed. As a result, only an event pattern rule satisfying a predetermined condition can be detected.

Moreover, the composition rule producing unit 214e determines whether a portion included in a connected event pattern rule satisfies the rule and deletes a portion that does not satisfy the rule from the event pattern rule. As a result, only the event pattern rule satisfying the rule can be detected.

Furthermore, combinations of rules to be connected are selected based upon information on connectable relationships between events included in rules. As a result, combinations of connectable rules can be searched effectively and rules can be connected.

In the first and second embodiments, times ts and te, which define nearness in occurrence time between two events, are set in advance in the time constraint Ft (t1, t2). In an actual analysis of an event log, however, since a range of occurrence times found between events is frequently unclear, it is difficult to set the times ts and te in advance in some cases. Proper time interval can be set automatically. This approach will be explained below as a third embodiment of the present invention.

In the third embodiment, the time constraint Ft (t1, t2) is defined as $t1-w \leq t2 \leq t1$. Here, w represents a threshold determining a time interval where a relationship is found between events, and it is a value automatically set in a method described below. In this case, the co-occurrence probability P(c1, c2, ts, te) is represented as P(c1, c2, −w, 0).

In the pattern detecting processing according to the third embodiment, the probability calculating unit 214c of the pattern detecting device 21 obtains a threshold w satisfying P(c1, c2, −w, 0)≧minconf to determine a proper time interval where a relationship is found between events.

Figure 11:
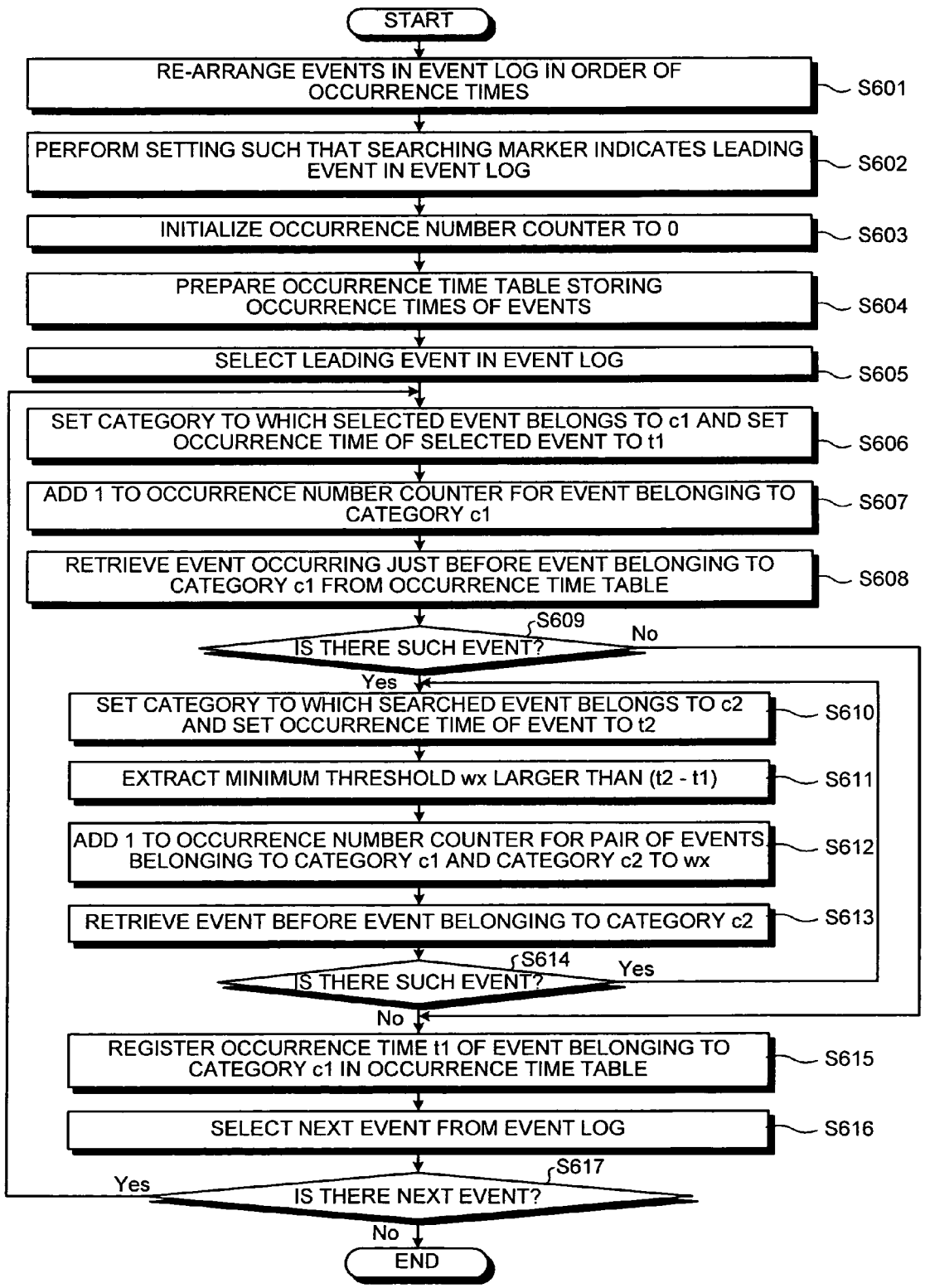
FIG. 11 is flowchart of a processing procedure of a calculating processing of the number of occurrences N (c1) and N (c1, c2, −w, 0) of an event.

A calculation processing for calculating numbers of event occurrences N (c1) and N (c1, c2, −w, 0), which the probability calculating unit 214c uses for calculation of the co-occurrence probability P(c1, c2, −w, 0), will be explained below. FIG. 11 is a flowchart of the calculation processing.

Before the calculation of the numbers of event occurrences N (c1) and N (c1, c2, −w, 0), some candidate values for the threshold w are set in advance. The set candidate values are arranged in an ascending order as w1, w2, ... wN and the number of candidate values is defined as Nw. Here, wN represents an indefinite time. When 20 candidate values that increase in a doubling manner are prepared, they can respond to almost all time intervals in which a relationship is found between events, which is desirable.

As shown in FIG. 11, first, the probability calculating unit 214c performs a processing for re-arranging events included in an event log in the order of occurrence times (step S601). The probability calculating unit 214c performs setting such that a searching marker indicates a leading event of the re-arranged events in the event log (step S602), and initializes a value in the counter counting the number of event occurrences to 0 (step S603).

Subsequently, the probability calculating unit 214c prepares an occurrence time table storing occurrence times of events therein (step S604). Here, the occurrence time table has a storage region where events are registered by the number of categories of event. At this time, any data is not registered in the occurrence time table, and occurrence times of new events are sequentially registered in this order according to a processing explained below.

Thereafter, the probability calculating unit 214c selects the leading event in the event log (step S605) and sets a category and an occurrence time of the selected event to c1 and t1 (step S606). The probability calculating unit 214c adds 1 to the occurrence number counter for the event belonging to category c1 (step S607). The value of the occurrence number counter becomes a value for N (c1).

Then, the probability calculating unit 214c searches for an event occurred just before an event belonging to category c1 from the occurrence time table (step S608). The probability calculating unit 214c examines whether there is an event occurred just before the event belonging to category c1 (step S609). When there is not such an event (step S609, No), a processing for registering an occurrence time t1 of the event belonging to category c1 in the occurrence time table (step S615).

When there is an event occurred just before the event belonging to category c1 (step S609, Yes), the probability calculating unit 214c performs a processing for setting the kind and the occurrence time of the searched event to c2 and t2 (step 610).

The probability calculating unit 214c extracts the minimum threshold from the thresholds wx (x=1, 2, ... , N) larger than the value (t2−t1) (step S611). The probability calculating unit 214c adds 1 to an occurrence number counter for a pair of events belonging to category c1 and belonging to category c2 to wx (step S612). The value of the occurrence number counter for the pair of events is a value for N (c1, c2, −wx, 0).

Subsequently, the probability calculating unit 214c searches for an event occurred before an event belonging to category c2 from the occurrence time table (step s613) and examines whether there is such an event (step S614). When there is such an event (step S614, Yes), the probability calculating unit 214c advances to step S610 to continue to perform a processing for steps subsequent thereto.

Next, when there is not such an event (step S614, No), the probability calculating unit 214c registers the occurrence time t1 of an event belonging to category c1 in the occurrence time table (step S615), and performs a processing for selecting the next event from the event log (step S616).

As the result of retrieval, the probability calculating unit 214c examines whether there is the next event (step S617). When there is the next event (step S617, Yes), the probability calculating unit 214c proceeds to step S606 to continue to process the steps subsequent thereto. When there is not the next step (step S617, No), the probability calculating unit 214c terminates the calculating processing for the numbers of event occurrences N (c1) and N (c1, c2, −wx, 0).

Thereafter, the probability calculating unit 214c calculates a value of the occurrence probability P(c1, c2, −wx, 0) using the calculation results of the numbers of occurrences N (c1) and N (c1, c2, −wx, 0) from $$P(c1, c2, -wx, 0) = N(c1, c2, -wx, 0)/N(c1).$$

Regarding an event with each kind, the probability calculating unit 214c performs a processing for selecting the minimum wx satisfying P(c1, c2, −wx, 0)≧minconf to set the selected minimum wx value as a threshold w for the time constraint Ft (t1, t2). Here, such a fact that wx is infinite (wx=wN) means there is not a proper time interval in which a relationship is found between events.

The co-occurrence probability P(c1, c2, −wx, 0) between events becomes large according to increase of a time interval in which a relationship is found between events, which may result in such an erroneous determination that a co-occurrence property is present between events originally unrelated with each other. Therefore, a processing for discarding an invalid relationship between events is performed by such a method as explained below.

First, when it is assumed that occurrence of an event belonging to category c1 and occurrence of an event belonging to category c2 are independent from each other, a probability where the event belonging to category c2 occurs in a time range of (t1−w≦t2≦t1) is defined as P' (c2, w). Here, t1 represents an occurrence time of an event belonging to category c1 and t2 represents an occurrence time of an event belonging to category c2.

When the probability of occurrence of the event belonging to category c2 is defined in this manner, such a fact that a correlation relationship is present between the event belonging to category c1 and the event belonging to category c2 is represented as $$P(c1, c2, -w, 0) > P'(c2, w).$$

Here, the occurrence probability P' (c2, w) is determined based upon a distribution model for occurrence times of events. Here, it is assumed that occurrence times of events belonging to category c2 are distributed uniformly. That is, when a term where events have been recorded in the event log is defined as T, a time density d (c2) of events belonging to category c2 is represented as $$d(c2) = N(c2)/T,$$

where, N (c2) is the number of events belonging to category c2 occurred in the term T.

Therefore, the occurrence probability P' (c2, w) can be calculated from $$P'(c2, w) = d(c2) \times w = N(c2) \times w/T.$$

The probability calculating unit 214c discards a combination of events having no co-occurrence relationship using the occurrence probability P' (c2, w) calculated in this manner. Specifically, the probability calculating unit 214c discards a combination of an event belonging to category c1 and an event belonging to category c2 which does not satisfy $$P(c1, c2, -w, 0) > \theta \times P'(c2, w),$$

where, θ is a predefined real number of 1 or more representing strength of correlation between an event belonging to category c1 and an event belonging to category c2.

As explained above, in the third embodiment, the probability calculating unit 214c sets the value w based upon the results obtained by detecting the occurrence pattern of an event where the co-occurrence probability P(c1, c2, −w, 0) satisfies the minimum confidence factor minconf or more to respective candidate values wx. As a result, presence or absence of relationship between events can be determined accurately a proper value of w can be set automatically.

In the first to third embodiments, the minimum confidence factor minconf is preliminarily set in the co-occurrence probability condition. However, it is difficult to properly set the minimum confidence factor minconf used for determining presence or absence of a relationship between events in advance. Therefore, it may be advantageous to set a proper minimum confidence factor minconf automatically. This approach will be explained below as a fourth embodiment.

Figure 12:
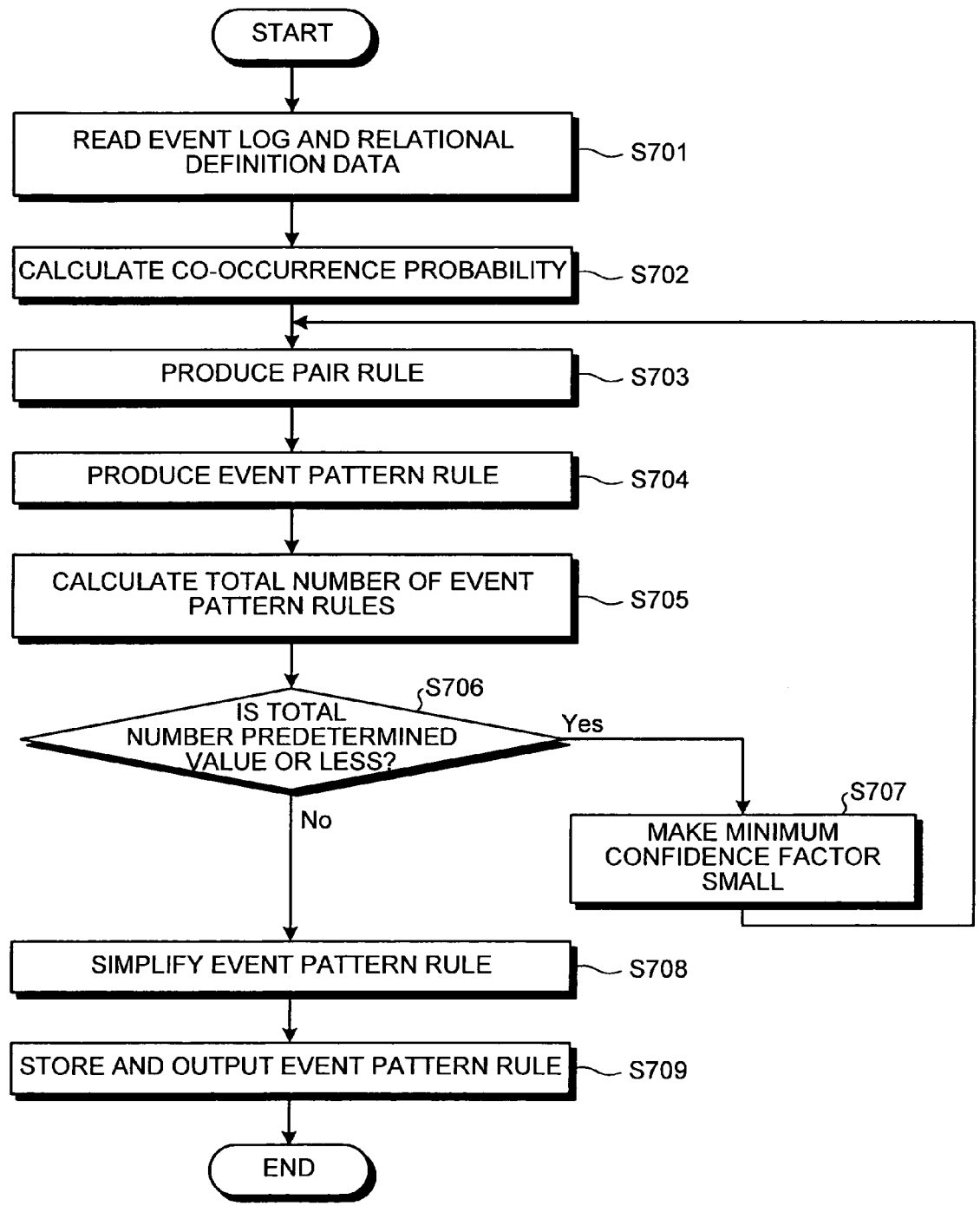
FIG. 12 is a flowchart of a processing procedure of a pattern detecting processing of a minimum confidence factor minconf by automatic setting.

FIG. 12 is a flowchart of a pattern detecting processing based upon an automatic setting for the minimum confidence factor minconf. As shown in FIG. 12, first, the probability calculating unit 214c of the pattern detecting unit 21 shown in FIG. 2 reads the event log 213a and the relational definition data 213b stored in the storage unit 213 (step S701).

The probability calculating unit 214c calculates an co-occurrence probability P(c1, c2, ts, te) of events from the read event log 213a (step S702), and the pair rule calculating or producing unit 214d performs a processing for producing a pair rule based upon the co-occurrence probability P(c1, c2, ts, te) calculated by the probability calculating unit 214c and the relational definition data 213b (step S703).

Thereafter, the composition rule producing unit 214e connects connectable pair rules to produce an event pattern rule (step S704). The composition rule producing unit 214e calculates the total number of event pattern rules produced (step S705) to examine whether the total number is a predetermined number Nr or less (step S706).

When the total number is the predetermined number Nr or less (step S706, Yes), the probability calculating unit 214c performs setting again such that the minimum confidence factor minconf is less than a predetermined degree (step S707). A processing for steps subsequent to step S703 is continued based upon the minimum confidence factor minconf set again.

When the total number of event pattern rules exceeds the predetermined number Nr (step S706, No), the rule simplifying unit 214f performs a processing for simplifying the event pattern rule produced by the composition rule producing unit 214e (step S708).

The rule managing unit 214g performs a processing for storing the event pattern rule in the storage unit 213 and outputting the same on the display unit 212 (step S709) to terminate the pattern detecting processing based upon the automatic setting for the minimum confidence factor minconf.

As described above, in the fourth embodiment, the probability calculating unit 214c sets the minimum confidence factor minconf based upon the total number Nr of event pattern rules obtained from the result of event pattern rule detection. As a result, presence or absence of a relationship between events can be determined precisely because a proper minimum confidence factor minconf can be set automatically.

In the third and fourth embodiments, the threshold defining nearness in occurrence time between events in the time constraint and the minimum confidence factor in the co-occurrence probability condition are set automatically. However, it is difficult to determine a parameter(s) of these parameters which are important for detecting a proper event pattern rule and a parameter(s) thereof to be set again. As a fifth embodiment, therefore, a case that a parameter(s) that is useful to detect a proper event pattern rule is automatically selected and a value is set in the selected parameter will be explained.

An evaluation function that evaluates a detected event pattern rule will be first explained. In the fifth embodiment, the event pattern rule is evaluated from $$E=(\text{minconf}-0.7) \times Na,$$

where, "minconf" is the minimum confidence factor in the co-occurrence probability condition, and Na is the total number of edges in graph obtained by performing a simplifying processing on an event pattern rule. Here, such setting is performed that an event pattern rule that is large in the minimum confidence factor minconf and the total number of edges Na is evaluated highly.

Figure 13:
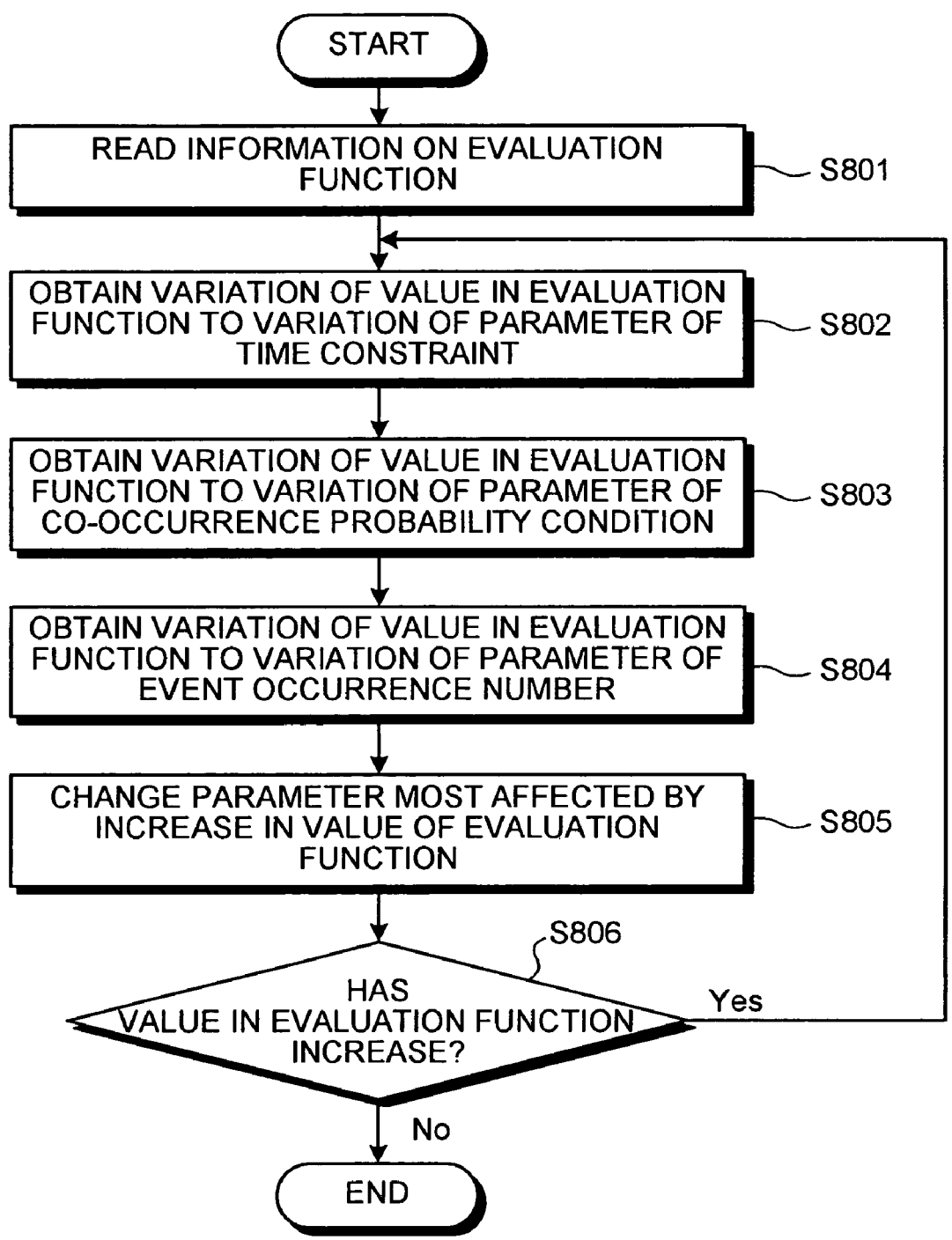
FIG. 13 is a flowchart of a processing procedure of a setting processing of parameters effective for detection of a proper event pattern rule.

FIG. 13 is a flowchart of a setting processing for setting parameters useful for detecting a proper event pattern rule. This processing is performed by the relational definition data managing unit 214b of the pattern detecting device 21. Information about the evaluation function is stored in the storage unit 213 as the relational definition data 213b.

As shown in FIG. 13, first, the relational definition data managing unit 214b reads information about the evaluation function from the relational definition data 213b (step S801). The relational definition data managing unit 214b obtains a variation of a value of the evaluation function to variations of the parameters ts and te in the time constraint Ft (step S802). The value of the evaluation function is calculated by performing a processing for detecting an event pattern rule such as shown in FIG. 5.

Subsequently, the relational definition data managing unit 214b obtains a variation of a value of the evaluation function to a variation of the minimum confidence factor minconf which is the parameter of the co-occurrence probability condition (step S803). Further, the relational definition data managing unit 214b obtains a variation of a value of the evaluation function to a variation of the parameter minsup of the event occurrence number (step S804).

Thereafter, the relational definition data managing unit 214b performs a processing for changing a value of a parameter of the parameters ts and te of the time constraint Ft, the minimum confidence factor minconf which is the parameter of the co-occurrence probability condition, and the parameter minsup of the occurrence number of events which is most effective for increasing the value of the evaluation function (step S805).

The relational definition data managing unit 214b examines whether the value of the evaluation function has increased (step S806). When the value has increased (step S806, Yes), the relational definition data managing unit 214b proceeds to step S802 to continue to perform a processing for steps subsequent thereto. When the value has not increased (step S807, No), the relational definition data managing unit 214b terminates the setting processing for the parameter.

As described above, in the fifth embodiment, since the relational definition data managing unit 214b sets the thresholds ts and te concerning a time difference in occurrence time between events, the minimum confidence factor minconf concerning the co-occurrence probability of events or the parameter minsup of the occurrence number of events based upon the evaluation function E evaluating the detection result of the event pattern rule, a parameter suitable for detecting an event pattern rule with high evaluation can be set automatically.

The pattern detecting device and the pattern detecting method explained in the first to fifth embodiments can be realized by causing such a computer system as a personal computer or a work station to execute a computer program prepared in advance. A computer system that executes a computer program having a function similar to the pattern detecting devices (the pattern detecting methods) explained in the first to fifth embodiments will be explained.

Figure 14:
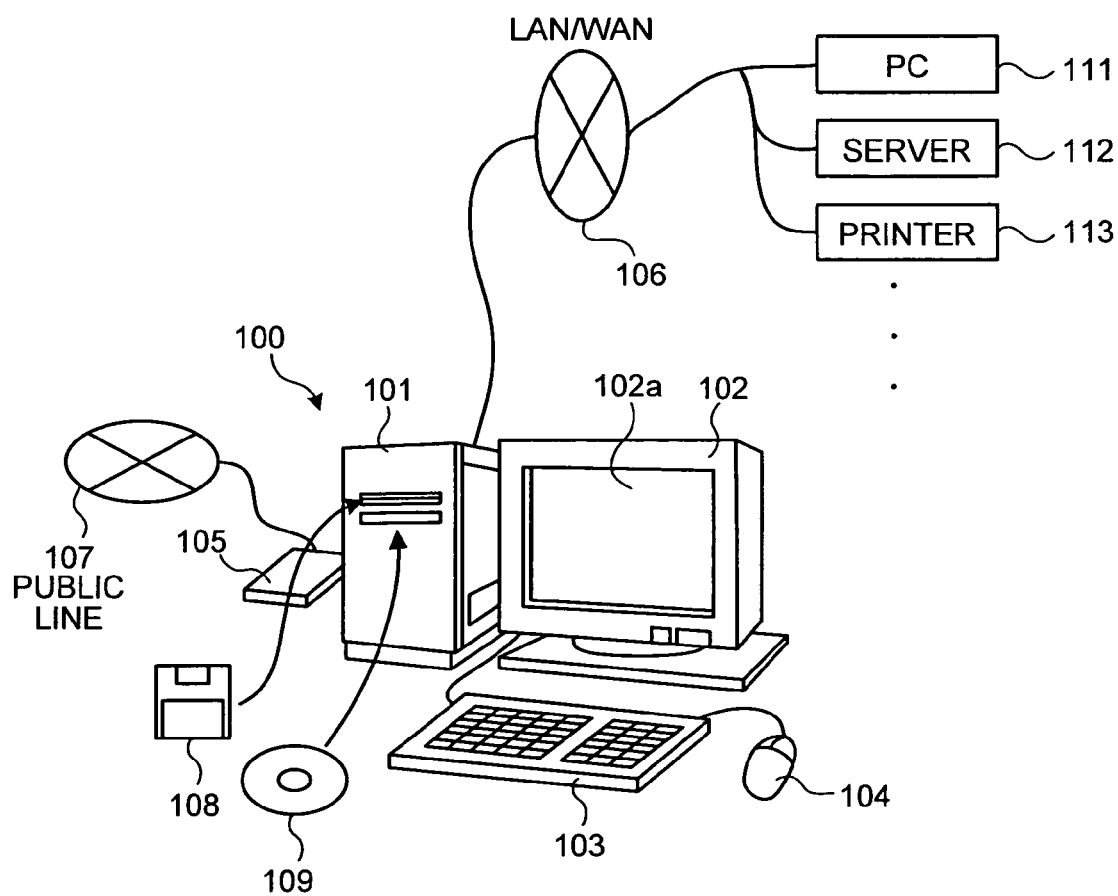
FIG. 14 is a system configuration of a computer system according to an embodiment of the present invention.
Figure 15:
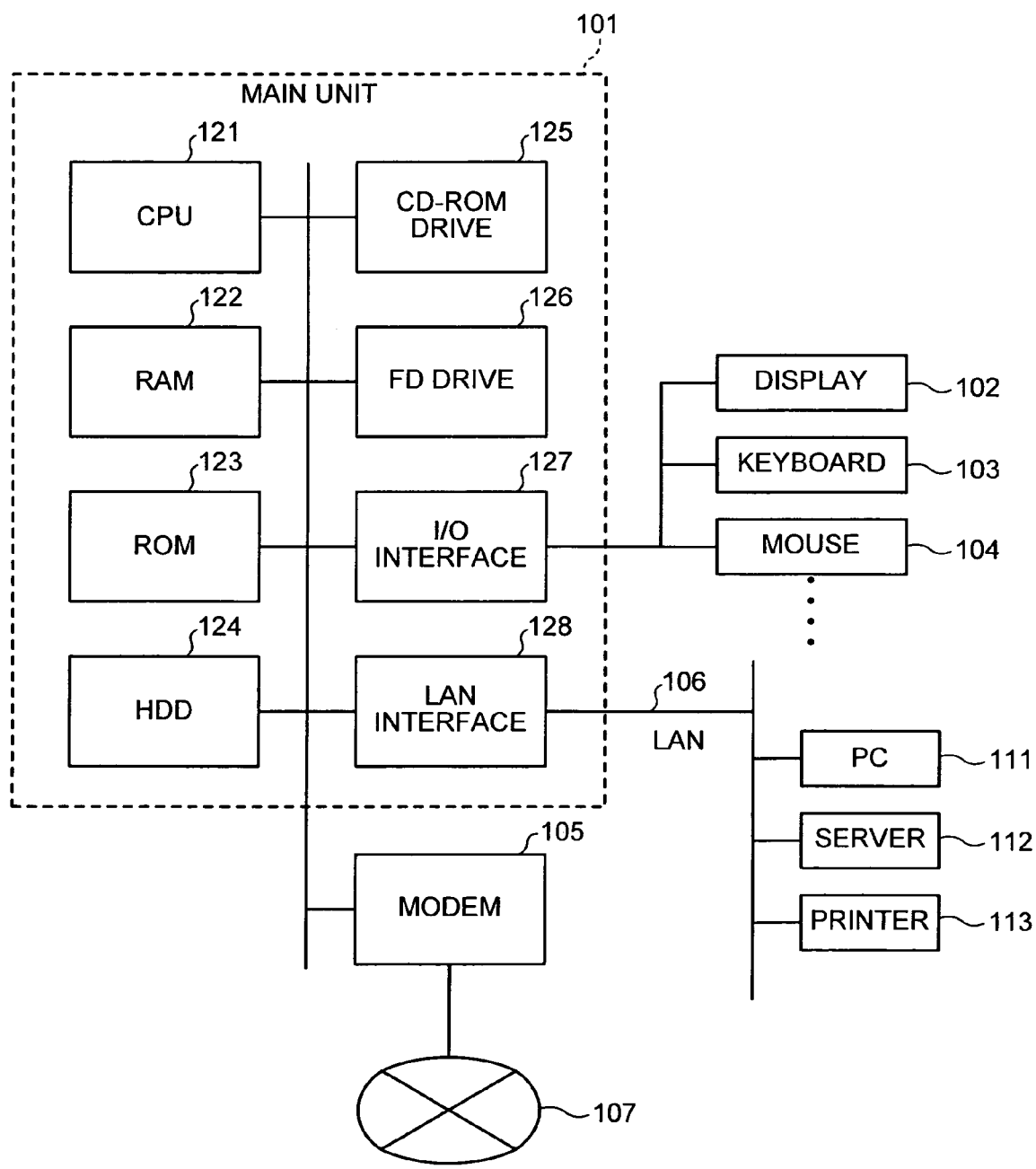
FIG. 15 is a block diagram of a main unit in the computer system shown in FIG. 14.
Figure 16:
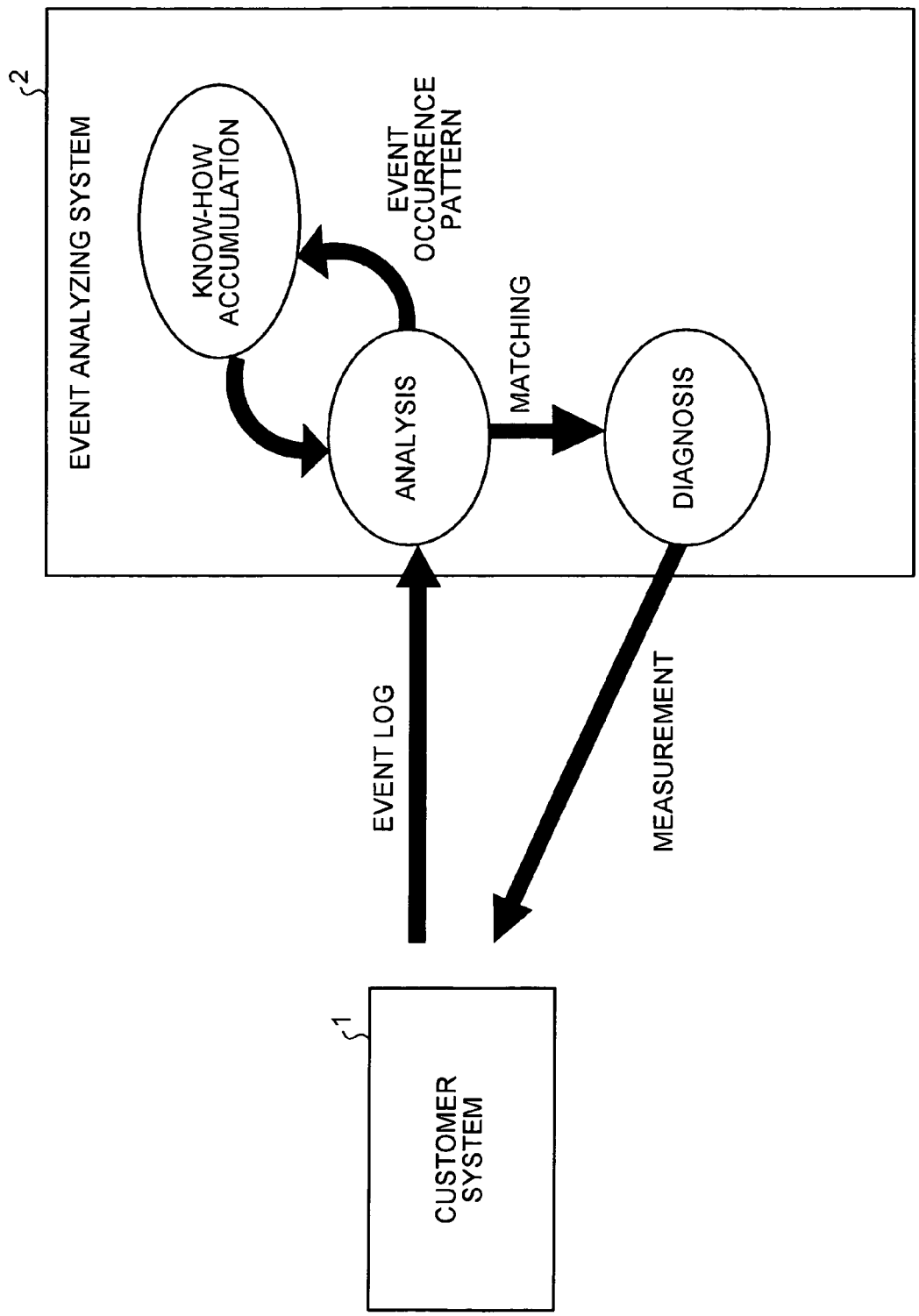
FIG. 16 is a schematic for explaining an event analyzing system that analyzes an occurrence pattern of an event.
Figure 17:
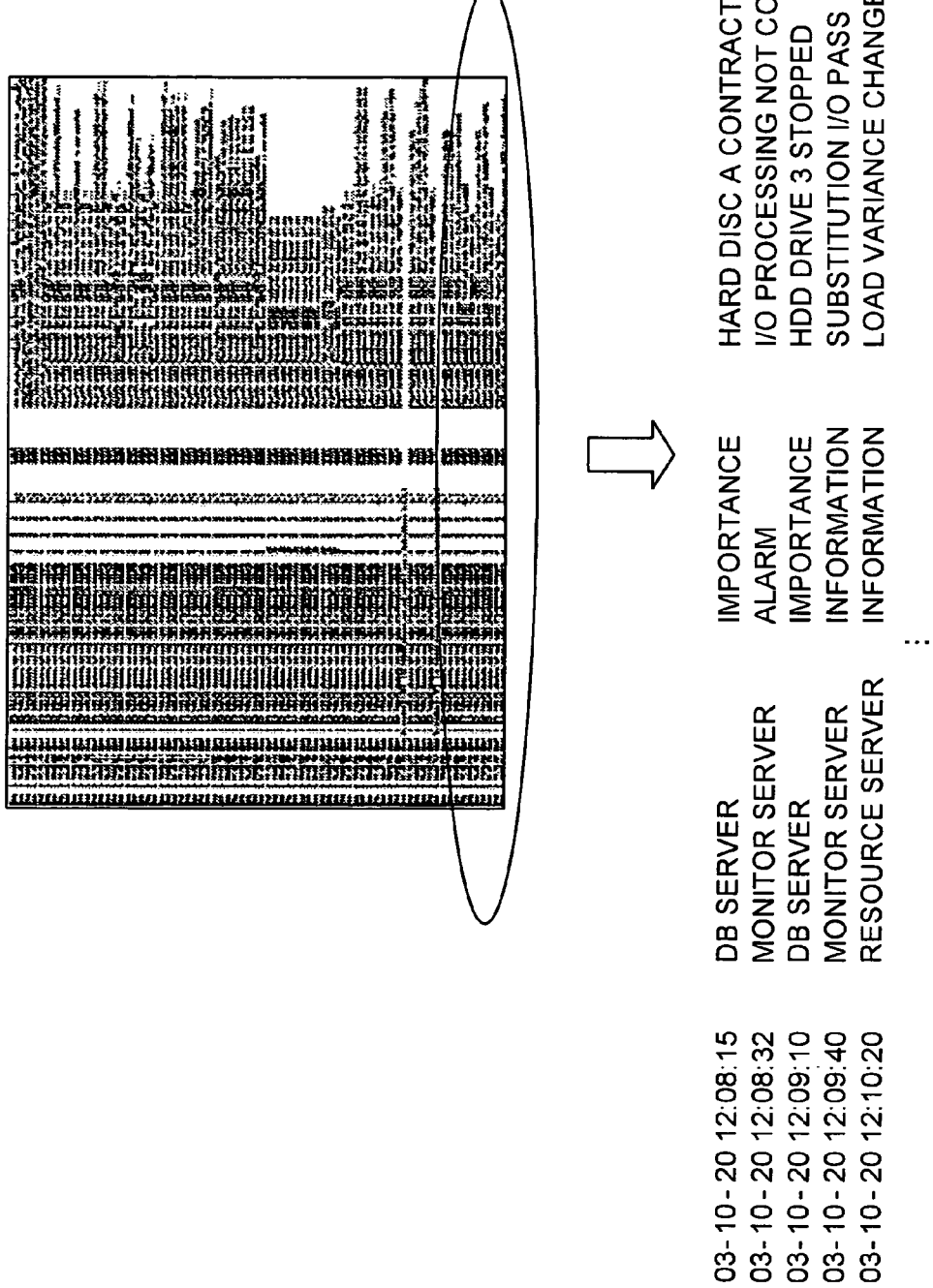
FIG. 17 is an event log recording occurred events therein.

FIG. 14 is a system configuration diagram of a configuration of a computer system 100 according to the present invention. FIG. 15 is a block diagram of a configuration of a main unit 101 in the computer system 100 shown in FIG. 14.

As shown in FIG. 14, the computer system 100 according to the present invention has a main unit 101, a display 102 which displays information such as an image on a display screen 102a according to an instruction from the main unit 101, a keyboard 103 used for inputting various information pieces into the computer system 100, and a mouse 104 used for designating any position on the display screen 102a of the display 102.

As shown in FIG. 15, the main unit 101 in the computer system 100 has a CPU 121, a RAM 122, a ROM 123, a hard disc drive (HDD) 124, a CD-ROM drive 125 receiving a CD-ROM 109, a flexible disc (FD) drive 126 receiving a flexible disc (FD) 108, an I/O interface 127 connecting the display 102, the keyboard 103, and the mouse 104, and a LAN interface 128 connecting to a local area network or a wide area network (LAN/WAN) 106.

The computer system 100 is connected with a modem 105 used for connecting to a public line 107 such as Internet and is connected with another computer system (PC) 111, a server 112, a printer 113, and the like via a LAN interface 128 and the LAN/WAN 106.

The computer system 100 realizes the pattern detecting device (the pattern detecting method) by reading the computer program recorded in a predetermined recording medium to execute the same.

The predetermined recording medium includes any recording medium on which a computer program that can be read by the computer system 100 is recorded, for example, "a portable physical medium" such as the flexible disc (FD) 108, the CD-ROM 109, an MO disc, a DVD disc, a magneto-optical disc, or an IC card, "a fixed physical medium" such as a hard disc drive (HDD) 124 provided outside or inside the computer system 100, the RAM 122 or the ROM 123, and "a communication medium" holding a program for a short time at a time of program transmission, such as the public line 107 connected via the modem 105 or the LAN/WAN 106 connected with the another computer system 111 and the server 112.

That is, the computer program is recorded in such a recording medium as the "portable physical medium", "fixed physical medium", or "communication medium" in a computer-readable manner, and the computer system 100 realizes the pattern detecting device and the pattern detecting method by reading the computer program from such a recording medium to execute the same.

The computer program is not limited to only execution performed by the computer system 100, but the present invention is similarly applied to a case that another computer system 111 or server 112 executes the computer program or a case that the another computer system 111 and server 112 executes the computer program in cooperation with each other.

Though the embodiments of the present invention have been explained above, the present invention may be implemented with various embodiments modified in the scope and spirit of the technical idea described in the claims.

For example, all or some of the respective processings which have been explained as processings to be automatically performed in the embodiments may be performed manually, or all or some of the processings which have been explained as processings to be manually performed may be performed automatically utilizing known methods. Besides, information including the processing procedures, the control procedures, the specific names, various data pieces or parameters shown in this text and drawings may be modified arbitrarily except for the special mentions.

The respective constituent elements of respective devices illustrated are functional and conceptual, and they may not be configured physically as illustrated necessarily. That is, the specific forms of the distribution/integration of respective devices are not limited to illustrated ones, but all or some of the respective devices can be configured functionally or physically through distribution/integration thereof corresponding to loads on or usage situations of respective devices at any unit.

Further, all or some of respective processing functions implemented by respective devices may be realized by a CPU and a program analyzed and performed by the CPU, or as a hardware based upon wired logic.

According to the present invention, detailed information on the occurrence pattern of an event can be extracted.

Moreover, the relationship between events can be determined precisely.

Moreover, values that are suitable for detecting an occurrence pattern can be set automatically.

Moreover, only the occurrence pattern that satisfies a predetermined condition can be detected.

Moreover, a combination of connectable occurrence patterns can be retrieved efficiently and the patterns can be connected.

Moreover, a complicated relationship between events is simplified so that information which a user can understand easily can be provided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer readable recording medium on which is stored a computer program that causes a computer to execute:

detecting an occurrence pattern of an event from event data based upon information concerning plural kinds of relationships defined among events; and outputting the occurrence pattern, wherein the information concerning the plural kinds of relationships is information defined based upon an occurrence time of an event and an occurrence probability of an event, and the occurrence probability is a co-occurrence probability that, when a first event has occurred at a first time, a second event occurs within a predetermined time from the first time.

2. The computer readable recording medium according to claim 1, wherein the detecting further includes setting a set value concerning a range of occurrence times of events between which presence or absence of a relationship is determined based on a result of detection of the occurrence pattern.

3. The computer readable recording medium according to claim 1, wherein the detecting further includes setting a set value concerning of an occurrence probability of events between which presence or absence of a relationship is determined based on a result of detection of the occurrence pattern.

4. The computer readable recording medium according to claim 1, wherein the detecting further includes setting a set value concerning a range of occurrence times of events between which presence or absence of a relationship is determined or a set value concerning of an occurrence probability of events between which presence or absence of a relationship is determined based upon an evaluation function that evaluates a result of detection of the occurrence pattern.

5. The computer readable recording medium according to claim 1, wherein the information concerning the plural kinds of relationships includes information defining different kinds of relationships according to magnitude of a difference in occurrence time between occurrences of two events.

6. The computer readable recording medium according to claim 1, wherein the detecting includes detecting an occurrence pattern constituted of three or more events by connecting occurrence patterns constituted of two events.

7. The computer readable recording medium according to claim 6, wherein the detecting includes determining whether connection of occurrence patterns is performed based on a connection condition determining whether connection of occurrence patterns is allowed.

8. The computer readable recording medium according to claim 6, wherein the detecting includes determining whether a portion included in connected occurrence patterns satisfies a predetermined criterion and deletes a portion which does not satisfy the predetermined criterion from the occurrence patterns.

9. The computer readable recording medium according to claim 6, wherein the detecting includes selecting a combination of occurrence patterns to be connected based upon information concerning a relationship connectable between events included in an occurrence pattern.

10. The computer readable recording medium according to claim 1, wherein the outputting includes integrating relationships between events included in the occurrence pattern detected at the detecting based upon information concerning a relationship between events included in an occurrence pattern to output an occurrence pattern where the relationships between events have been integrated.

11. An apparatus for detecting an occurrence pattern, comprising:

a pattern detecting unit that detects an occurrence pattern of an event from event data based upon information concerning plural kinds of relationships defined among events and outputs the occurrence pattern, wherein the information concerning the plural kinds of relationships is information defined based upon an occurrence time of an event and an occurrence probability of an event, and the occurrence probability is a co-occurrence probability that, when a first event has occurred at a first time, a second event occurs within a predetermined time from the first time.

12. A method of detecting an occurrence pattern, comprising:

detecting an occurrence pattern of an event from event data based upon information concerning plural kinds of relationships defined among events; and outputting the occurrence pattern, wherein the information concerning the plural kinds of relationships is information defined based upon an occurrence time of an event and an occurrence probability of an event, and the occurrence probability is a co-occurrence probability that, when a first event has occurred at a first time, a second event occurs within a predetermined time from the first time.

13. A computer readable storage medium on which is stored a computer program that causes a computer to execute:

detecting an occurrence pattern of an event from event data based upon information concerning plural kinds of relationships defined among events; and outputting the occurrence pattern, wherein the information concerning the plural kinds of relationships is information defined based upon an occurrence time of an event and an occurrence probability of an event, and the detecting further includes setting a set value concerning a range of occurrence times of events between which presence or absence of a relationship is determined or a set value concerning of an occurrence probability of events between which presence or absence of a relationship is determined based upon an evaluation function that evaluates a result of detection of the occurrence pattern.

* * * * *